(12) United States Patent
Tsukagoshi

(10) Patent No.: US 11,234,044 B2
(45) Date of Patent: Jan. 25, 2022

(54) TRANSMISSION APPARATUS, TRANSMISSION METHOD, ENCODING APPARATUS, ENCODING METHOD, RECEPTION APPARATUS, AND RECEPTION METHOD

(71) Applicant: Sony Group Corporation, Tokyo (JP)

(72) Inventor: Ikuo Tsukagoshi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/504,731

(22) Filed: Jul. 8, 2019

(65) Prior Publication Data

US 2020/0213657 A1 Jul. 2, 2020

Related U.S. Application Data

(60) Provisional application No. 62/786,022, filed on Dec. 28, 2018.

(51) Int. Cl.
| | |
|---|---|
| *H04N 5/917* | (2006.01) |
| *H04N 5/84* | (2006.01) |
| *H04N 5/89* | (2006.01) |
| *H04N 21/432* | (2011.01) |
| *H04N 21/434* | (2011.01) |

(Continued)

(52) U.S. Cl.
CPC ....... *H04N 21/432* (2013.01); *H04N 21/4345* (2013.01); *H04N 21/4348* (2013.01)

(58) Field of Classification Search
USPC ........ 386/330, 334, 326, 335, 343, 353, 263
See application file for complete search history.

(56) References Cited

U.S. PATENT DOCUMENTS

| | | | | |
|---|---|---|---|---|
| 10,542,259 | B2 * | 1/2020 | Tsukagoshi | .......... H04N 19/132 |
| 2010/0169318 | A1 * | 7/2010 | Thompson | ............ G06F 16/957 |
| | | | | 707/737 |

(Continued)

FOREIGN PATENT DOCUMENTS

| | | | | |
|---|---|---|---|---|
| JP | 2016-079891 | * | 4/2017 | ......... H04N 5/23232 |
| JP | 2017-085730 | * | 5/2018 | ........... H04N 21/434 |

(Continued)

OTHER PUBLICATIONS

M. Westerlund, "How to Write an RTP Payload Format",draft-ietf-payload-rtp-howto-12, Jan. 9, 2014,https://tools.ietf.org/id/draft-ietf-payload-rtp-howto-12.html"3.3.2. RTP Header".

(Continued)

*Primary Examiner* — Daquan Zhao
(74) *Attorney, Agent, or Firm* — Michael Best & Friedrich LLP

(57) ABSTRACT

A transmission apparatus includes a transmission unit. The transmission unit transmits a packet including divided image data as payload data, the divided image data being obtained by dividing image data having a predetermined frame frequency into a predetermined number of frames, the image data having the predetermined frame frequency being subjected to mixing processing for each frame, image data of a previous frame and/or a subsequent frame being selectively used in the mixing processing, and further transmits metadata including information regarding the mixing processing in association with image data of each frame.

19 Claims, 25 Drawing Sheets

(51) Int. Cl.
　　　*H04N 5/92* (2006.01)
　　　*H04N 5/94* (2006.01)

(56) References Cited

U.S. PATENT DOCUMENTS

| 2012/0033601 | A1* | 2/2012 | Song | H04H 20/57 |
| | | | | 370/312 |
| 2019/0166388 | A1* | 5/2019 | Tsukagoshi | H04N 21/434 |
| 2020/0021869 | A1* | 1/2020 | Tsukagoshi | H04N 5/23232 |

FOREIGN PATENT DOCUMENTS

| JP | 2018-186357 | * | 11/2018 | H04N 21/234 |
| JP | 2018-186357 | A | 11/2018 | |
| WO | 2012/153450 | A1 | 11/2012 | |
| WO | 2016/185947 | A1 | 11/2016 | |

OTHER PUBLICATIONS

International Search Report dated Mar. 17, 2020 for corresponding International Application No. PCT/JP2019/049713.

* cited by examiner

| Shutter speed (1/sec) | Transmission frame rate (fps) | Shutter angle (degree) |
|---|---|---|
| 240 | 240 | 360 |
| 300 | 240 | 288 |
| 240 | 120 | 180 |
| 120 | 60 | 180 |

FIG.8

| N | (N+1)th byte | | | (N+2)th byte | | (N+3)th byte | (N+4)th byte |
|---|---|---|---|---|---|---|---|
| 0 | V | P | X | CC | M | PT(Payload type) | Sequence number |
| 4 | Timestamp | | | | | | |
| 8 | Synchronization source (SSRC) identifier | | | | | | |

FIG.13

| | |
|---|---|
| Version number (V) | Indicates version of RTP. Current version is 2. |
| Padding bit (P) | Indicates that payload is padded (1) or not padded (0). |
| Header extension bit (X) | Indicates that extension header is added (1) or not added (0). |
| CSRC count (CC) | Indicates length of CSRC list. In case where payload is combination of media streams, SSRC list of each media stream is stored as contributing source (CSRC) list. |
| Marker bit (M) | Indicates that important event defined by RTP profile to be used occurs. Used to indicate start, restart, end, or the like of stream. |
| Payload type (PT) | Used to identify media type of payload data. Indicates media encoding method defined in RFC 3551. Value "98" : ST2022-6, New_Value1: ST2110-20, New_value2 : Metadata |
| Sequence number | Unsigned 16-bit integer value incremented by 1 each time packet is transmitted. Initial value is generally set at random. Used to detect missing packets or used for alignment. |
| Timestamp | Indicates instant at which top of payload data is sampled. Used for reproduction of media. Value thereof is incremented for each packet at transmission of RTP packets. |
| Synchronization source (SSRC) identifier | Indicates SSRC of packet transmitter. |

FIG. 14

| Ext | |F| | VSID | FRcount | |R|S| | FEC | |CF| | RESERVE | | |
|---|---|---|---|---|---|---|---|---|---|
| MAP | | |FRAME | | FRATE | | SAMPLE | |EMT-RESERVE | | |
| Video timestamp (only if CF > 0 ) ||||||||||
| Header extension ( only if Ext > 0) ||||||||||
| Extension type ||||||||||
| ||||||||||
| ||||||||||

FIG.15

Payload Header is information for specifying that reproduction of contents to be transmitted by payload of packet can be performed in synchronization with reception side.

| Field | Description |
|---|---|
| EXT (4bits) | Represents number of extension words (1 word in 4 bytes) of payload header. |
| F (1bit) | "1" indicates that video format is included. "0" indicates contents other than video, such as metadata. |
| VSID (3bits) | 0= primary, 1= protect |
| FRcount (8bits) | Indicates value increased for each video frame |
| R (2bits) | Indicates reference of video timestamp. "00" not locked, "01" UTC, "10" private reference |
| S (2bits) | Indicates that payload is scrambled or not. "00" indicates that scrambling is not performed. |
| FEC (3bits) | Indicates type of error-correcting code to be used. "000" none, "001" column, "010" row&column |
| CF (4bits) | Indicates clock frequency of video signal. "0x1" 27MHz |
| MAP (4bits) | Indicate type of SDI stream. |
| FRAME (8bits) | Specifies combination of scanning method for video signal, number of pixels, and the like. |
| FRATE (8bits) | Indicates frame frequency of video signal. |
| SAMPLE (4bits) | Indicates chroma sampling structure of video signal. |
| Video timestamp (32 bits) | Timestamp for video signal synchronization between transmission and reception. Accuracy thereof is indicated by value specified by "CF". |

FIG.16

| Syntax | No. of Bits | Format |
|---|---|---|
| shutter_blending() { | | |
| reserved | 32 | bslbf |
| metadata type | 8 | uimsbf |
| shutter_blending_length | 8 | uimsbf |
| video_stream_id | 8 | uimsbf |
| reference_shutter_speed_code | 4 | uimsbf |
| number_of_blend_stages | 4 | uimsbf |
| for ( j = 0; j < number_of_blending_stages ; j++ ) { | | |
| reference_framerate_code | 4 | uimsbf |
| current_framerate_code | 4 | uimsbf |
| blending_flag | 1 | bslbf |
| reserved | 7 | bslbf |
| if ( blending_flag ) { | | |
| reserved | 2 | bslbf |
| blend_targets_code | 2 | uimsbf |
| blend_coefficients_code | 4 | uimsbf |
| } | | |
| } | | |
| } | | |

FIG.17

| Field | Description |
|---|---|
| reserved (32bits) | Reserved region conventionally defined |
| metadata type (8bits) | In case of "0x0A", extension region is defined as in present syntax/semantics. |
| shutter_blending_length(8bis) | Represents byte size from next element. |
| video_stream_id (8bits) | Indicates target video stream ID. Used only when used outside of video packet. |
| reference_shutter_speed_code (4bits) | Code value of reference shutter speed (camera shutter speed mainly at capturing). 0x1: 1/24sec  0x2: 1/25sec  0x3: 1/30sec  0x4: 1/50sec  0x5: 1/60sec  0x6: 1/100sec  0x7: 1/120sec  0x8: 1/180sec  0x9: 1/200sec  0xA: 1/240sec |
| number_of_blend_stages (4bits) | Indicates number of stages of mixing processing. Value is 1 or more. |
| reference_framerate_code (4bits) | Code value of reference frame rate (= frame rate of picture as mixing processing target). 0x1: 24fps  0x2: 25fps  0x3: 30fps  0x4: 50fps  0x5: 60fps  0x6: 100fps  0x7: 120fps  0x8: 200fps  0x9: 240fps |
| current_framerate_code (4bits) | Code value of current frame rate (= frame rate of picture after mixing processing). 0x1: 24fps  0x2: 25fps  0x3: 30fps  0x4: 50fps  0x5: 60fps  0x6: 100fps  0x7: 120fps  0x8: 200fps  0x9: 240fps |
| blending_flag (1bit) | Indicates blend flag. "1": mixing processing is performed  "0": mixing processing is not performed |
| blend_targets_code (2bits) | Indicates mixing processing target. Indicates that picture to be mixed with current picture at reference frame rate is any of previous picture, subsequent picture, or both of previous and subsequent pictures of current picture. "10": previous picture, "01": subsequent picture, "11": both of previous and subsequent pictures |
| blend_coefficients_code (4bits) | Code value indicating blend ratio (ratio of filter operation coefficients at mixing). Value of larger ratio is set as weighting coefficient for current picture, and value of smaller ratio is set as weighting coefficient for previous and subsequent mixing target pictures. "0x1" indicates "1:1", "0x2" indicates "2:1", "0x3" indicates "4:1", and "0x4" indicates "1:2:1". |

| Metadata A | |
|---|---|
| Reference shutter speed (1/sec) | 1/240 |
| Reference frame rate (fps) | 240 |
| Current frame rate (fps) | 240 |
| Blend flag | 0 |
| | |
| | |

360degree (100%)

| Metadata A | |
|---|---|
| Reference shutter speed (1/sec) | 1/240 |
| Reference frame rate (fps) | 240 |
| Current frame rate (fps) | 240 |
| Blend flag | 1 |
| Mixing processing target | Both of previous and subsequent pictures |
| Blend ratio | 1:2:1 |

1080degree (300%)

| Metadata A | |
|---|---|
| Reference shutter speed (1/sec) | 1/240 |
| Reference frame rate (fps) | 240 |
| Current frame rate (fps) | 120 |
| Blend flag | 0 |
| | |
| | |
| | |

180degree (50%)

| Metadata A | |
|---|---|
| Reference shutter speed (1/sec) | 1/240 |
| Reference frame rate (fps) | 240 |
| Current frame rate (fps) | 120 |
| Blend flag | 1 |
| Mixing processing target | Both of previous and subsequent pictures |
| Blend ratio | 1:2:1 |
| | |

540degree (=150%)

| Ext | F | VSID | FRcount | R | S | FEC | CF | RESERVE |
| --- | --- | --- | --- | --- | --- | --- | --- | --- |
| MAP | | FRAME | FRATE | SAMPLE | | video_stream_id | | |
| Video timestamp (only if CF > 0 ) | | | | | | | | |

FIG.24

| Syntax | No. of Bits | Format |
|---|---|---|
| Metadata RTP packet payload(){ | | |
| metadata start word | 32 | bslbf |
| Video_timestamp | 32 | uimsbf |
| shutter_blending() | | |
| } | | |

FIG.25

TRANSMISSION APPARATUS, TRANSMISSION METHOD, ENCODING APPARATUS, ENCODING METHOD, RECEPTION APPARATUS, AND RECEPTION METHOD

BACKGROUND

The present technology relates to a transmission apparatus, a transmission method, an encoding apparatus, an encoding method, a reception apparatus, and a reception method, and more particularly, to a transmission apparatus that handles image data on which mixing processing is performed, and the like.

In a case where a receiver, which performs decoding at a frame rate at which broadcasting has been performed from the past, receives broadcasting at a high frame rate, partial decoding of a stream impairs continuity of motions and degrades the quality of moving images. It is said that the degradation of the quality of moving images is mainly caused by strobing. The stroking occurs when the retinal projection of human eyes with respect to a quick motion becomes intermittent because time continuity between pictures partially decoded becomes coarse.

In order to reduce the degradation of the quality of moving images due to the strobing, the present applicant has been proposed the technology of performing pixel mixing between a picture and a previous or subsequent picture thereof in a frame period to be a reference (see WO 2015/076277). In this case, even if the receiver in the related art performs time subsampling, it is reflected in time sampling in which an element that has moved is partially decoded, thus reducing the degradation of the quality of moving images due to the strobing.

SUMMARY

It is desirable for a reception side to favorably handle image data on which mixing processing is performed, for example, at transmission of materials of the image data.

A concept of the present technology resides in a transmission apparatus including a transmission unit that transmits a packet including divided image data as payload data, the divided image data being obtained by dividing image data having a predetermined frame frequency into a predetermined number of frames, the image data having the predetermined frame frequency being subjected to mixing processing for each frame, image data of a previous frame and/or a subsequent frame being selectively used in the mixing processing, and further transmits metadata including information regarding the mixing processing in association with image data of each frame.

In the present technology, by the transmission unit, a packet including divided image data as payload data is transmitted, the divided image data being obtained by dividing image data having a predetermined frame frequency into a predetermined number of frames. Here, the image data having the predetermined frame frequency is subjected to mixing processing for each frame, image data of a previous frame and/or a subsequent frame being selectively used in the mixing processing. For example, the packet may conform to a format prescribed by a standard regarding video signal transmission using an internet protocol (IP) network. In this case, for example, the standard may be SMPTE ST2022-6 or SMPTE ST2110-20. For example, the transmission apparatus may further include a mixing processing unit that performs the mixing processing.

By the transmission unit, metadata including information regarding the mixing processing may further be transmitted in association with image data of each frame. For example, the mixing processing may include a predetermined number of stages of the mixing processing. Further, for example, the information regarding the mixing processing may include any one of information indicating whether image data of a corresponding frame is subjected to mixing processing or not, information of a camera shutter speed at capturing, information of a frame rate of a mixing processing target picture, information of a frame rate obtained after the mixing processing, information indicating a mixing processing target picture, and information indicating a filter operation coefficient ratio at mixing.

For example, the transmission unit may insert the metadata into a payload header of the packet including at least a top of the image data of each frame and transmit the metadata. Further, for example, the transmission unit may transmit the metadata in a metadata-dedicated packet associated with the packet including the image data of each frame.

As described above, in the present technology, a packet including divided image data as payload data, the divided image data being obtained by dividing image data having a predetermined frame frequency into a predetermined number of frames, is transmitted, and metadata including information regarding the mixing processing is also transmitted in association with image data of each frame. Thus, it is possible for a reception side to favorably handle image data on which mixing processing is performed, for example, at transmission of materials of the image data.

Further, another concept of the present technology resides in an encoding apparatus including: a reception unit that receives a packet including divided image data as payload data, the divided image data being obtained by dividing image data having a predetermined frame frequency into a predetermined number of frames, the image data having the predetermined frame frequency being subjected to mixing processing for each frame, image data of a previous frame and/or a subsequent frame being selectively used in the mixing processing, and further receives metadata including information regarding the mixing processing, the metadata being associated with image data of each frame, the information regarding the mixing processing including information indicating whether image data of a corresponding frame is subjected to mixing processing or not; and an encoding unit that, on the basis of the information regarding the mixing processing, encodes, among the image data having the predetermined frame frequency, image data of a frame subjected to the mixing processing as image data of a base layer and encodes, among the image data having the predetermined frame frequency, image data of a frame not subjected to the mixing processing as image data of an enhanced layer.

In the present technology, by the reception unit, a packet including divided image data as payload data is received, the divided image data being obtained by dividing image data having a predetermined frame frequency into a predetermined number of frames. Here, the image data having the predetermined frame frequency is subjected to mixing processing for each frame, image data of a previous frame and/or a subsequent frame being selectively used in the mixing processing. Further, metadata including information regarding the mixing processing is further received, the metadata being associated with image data of each frame. Here, the information regarding the mixing processing includes information indicating whether image data of a corresponding frame is subjected to mixing processing or not.

By the encoding unit, among the image data having the predetermined frame frequency, image data of a frame subjected to the mixing processing is encoded as image data of a base layer, and among the image data having the predetermined frame frequency, image data of a frame not subjected to the mixing processing is encoded as image data of an enhanced layer, on the basis of the information regarding the mixing processing.

As described above, in the present technology, the image data having the predetermined frame frequency subjected to the mixing processing is encoded on the basis of the information regarding the mixing processing (including information indicating whether image data of a corresponding frame is subjected to mixing processing or not). Thus, it becomes possible to easily and suitably encoding, among the image data having the predetermined frame frequency, image data of a frame subjected to the mixing processing as image data of a base layer and encoding, among the image data having the predetermined frame frequency, image data of a frame not subjected to the mixing processing as image data of an enhanced layer.

Further, another concept of the present technology resides in a reception apparatus including: a reception unit that receives a packet including divided image data as payload data, the divided image data being obtained by dividing image data having a predetermined frame frequency into a predetermined number of frames, the image data having the predetermined frame frequency being subjected to mixing processing for each frame, image data of a previous frame and/or a subsequent frame being selectively used in the mixing processing, and further receives metadata including information regarding the mixing processing, the metadata being associated with image data of each frame; and a processing unit that performs inverse mixing processing on the image data having the predetermined frame frequency on the basis of the information regarding the mixing processing, and acquires image data for display.

In the present technology, by the reception unit, a packet including divided image data as payload data is received, the divided image data being obtained by dividing image data having a predetermined frame frequency into a predetermined number of frames. Here, the image data having the predetermined frame frequency is subjected to mixing processing for each frame, image data of a previous frame and/or a subsequent frame being selectively used in the mixing processing. Further, metadata including information regarding the mixing processing is further received, the metadata being associated with image data of each frame.

By the processing unit, inverse mixing processing is performed on the image data having the predetermined frame frequency on the basis of the information regarding the mixing processing, and image data for display is acquired.

As described above, in the present technology, inverse mixing processing is performed on the image data having the predetermined frame frequency, which is subjected to the mixing processing, on the basis of the information regarding the mixing processing, and image data for display is acquired. Thus, it is possible to easily and suitably perform inverse mixing processing and acquire image data for display.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 8 is a diagram showing an example of a correspondence relationship between a shutter speed (1/sec), a transmission frame rate (fps), and a shutter angle (degree);

FIG. 13 is a diagram showing a structural example of an RTP header;

FIG. 14 is a diagram showing the contents of main information in the structural example of the RTP header;

FIG. 15 is a diagram showing a structural example of a payload header;

FIG. 16 is a diagram showing the contents of main information in the structure of the payload header;

FIG. 17 is a diagram showing a structural example of "shutter_blending ( )";

FIG. 18 is a diagram showing the contents of main information in a structural example of "shutter_blending ( )";

FIGS. 19A and 19B are each a diagram for describing a specific example of metadata;

FIGS. 20A and 20B are each a diagram for describing a specific example of metadata;

FIG. 24 is a diagram showing a structural example of a payload header; and

FIG. 25 is a diagram showing a structural example of a payload header and a payload of a metadata packet.

DETAILED DESCRIPTION OF EMBODIMENTS

Hereinafter, a mode for implementing the present disclosure (hereinafter, referred to as embodiment) will be described. Note that description will be given in the following order.
1. Embodiment
2. Modified example

1. Embodiment

Broadcasting Flow

Figure 1A:
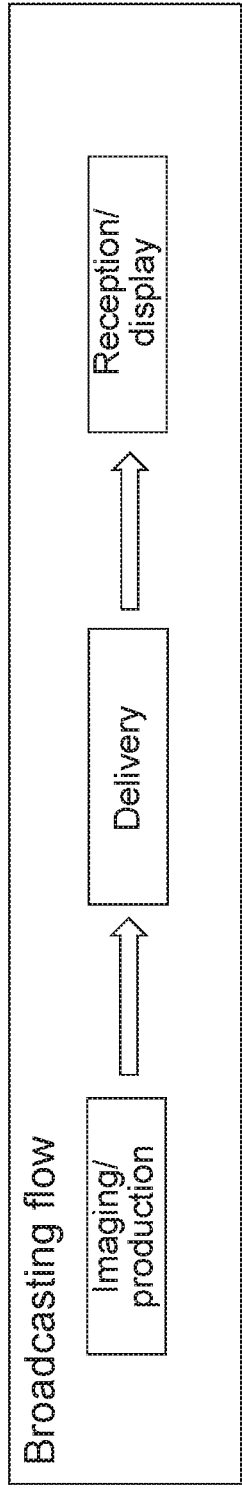
FIGS. 1A and 1B are diagrams respectively showing a broadcasting flow and an example of a system configuration corresponding to imaging/production and delivery steps.

FIG. 1A shows a broadcasting flow. The broadcasting flow includes an imaging/production step of acquiring image data of a material video, a delivery step of transmitting the image data of the material video, and a reception/display step of receiving the image data of the material video and performing image displaying.

Figure 1B:
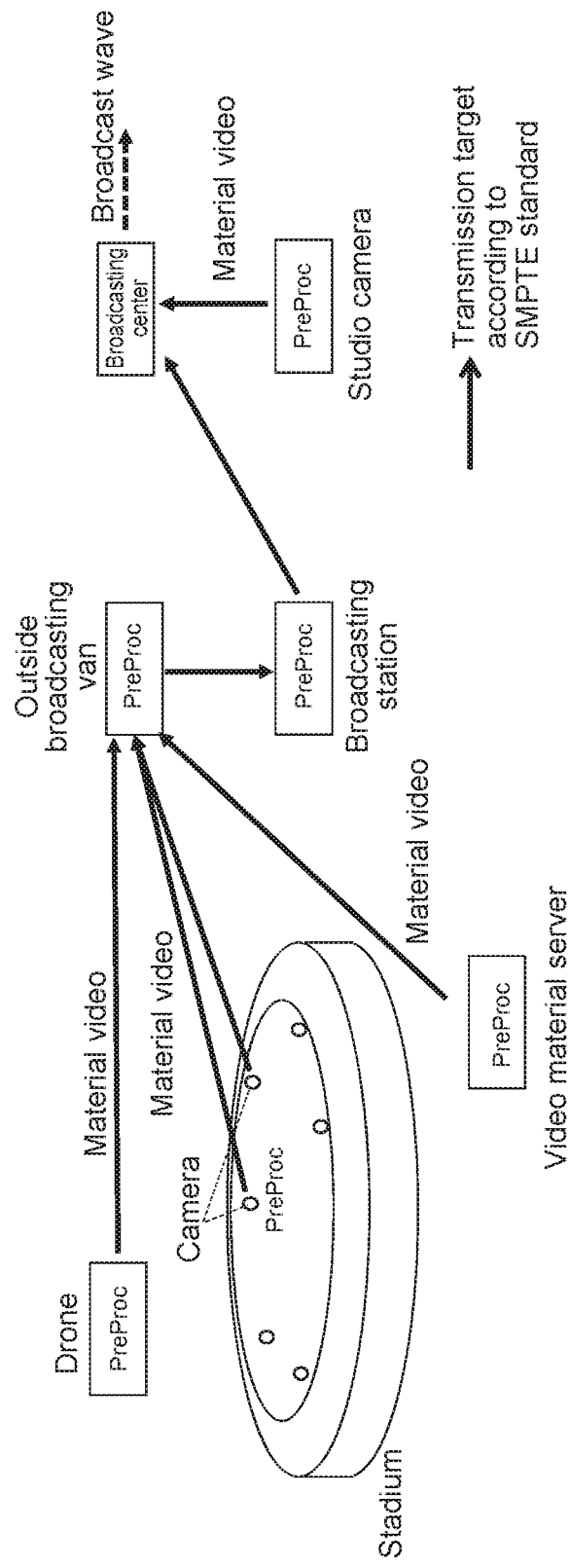

FIG. 1B shows an example of a system configuration corresponding to the imaging/production step and the delivery step. For example, image data having a predetermined frame frequency of a material video captured by imaging apparatuses (hereinafter, cameras) in a stadium is transmitted to an outside broadcasting van. Further, for example, image data having a predetermined frame frequency of a material video captured by a camera of a drone is transmitted to the outside broadcasting van. Further, for example, image data having a predetermined frequency is transmitted as a material video from a video material server to the outside broadcasting van.

Further, the image data of the material video that is obtained after editing in the outside broadcasting van is transmitted to a broadcasting center via a relay station. Further, image data having a predetermined frame frequency of a material video captured by a camera in a studio is transmitted to the broadcasting center. The image data having the predetermined frame frequency of the material video is then encoded and transmitted from the broadcasting center via broadcast wave.

The above-mentioned image data having the predetermined frame frequency of each material video is a transmission target according to society of motion picture and television engineers (SMPTE) standard. In this case, the image data having the predetermined frame frequency is divided into a predetermined number of frames, and a packet including the divided image data obtained thereby is transmitted as payload data. The packet conforms to the format prescribed by a standard regarding video signal transmission using an Internet protocol (IP) network. In this case, the video signal is, for example, a signal of a material video of a program.

In this embodiment, mixing processing in which image data of a previous frame and/or a subsequent frame is selectively used is performed for each frame on the image data having the predetermined frame frequency of the material video. The mixing processing is performed in order to mitigate degradation of the quality of moving images due to strobing in a receiver that creates a display image by partial decoding.

The mixing processing is performed by a mixing processing unit, e.g., a preprocessor (PreProc), included in an imaging apparatus that captures material videos, such as a camera of a drone, a camera of a stadium, or a camera of a studio. Alternatively, the mixing processing is performed by a preprocessor included in an apparatus that receives a material video captured by the imaging apparatus, such as a drone, a video material server, an outside broadcasting van, or a relay station. The mixing processing is performed not only in one stage but also in two stages, three stages, . . . . Note that all of the camera of the drone (or drone), the camera of the stadium, the video material server, the outside broadcasting van, the relay station, and the camera of the studio do not need to include a preprocessor, but it is assumed that the mixing processing is performed on at least the image data having the predetermined frame frequency of the material video, which is transmitted to the broadcasting center.

In a case where the image data having the predetermined frame frequency, on which the mixing processing is performed, is to be transmitted to the next stage, metadata including information regarding the mixing processing is associated with image data of each frame and then transmitted. The information regarding mixing processing includes information indicating whether the mixing processing is performed on image data of a corresponding frame or not, and the like.

Transmission/Reception System

Figure 2:
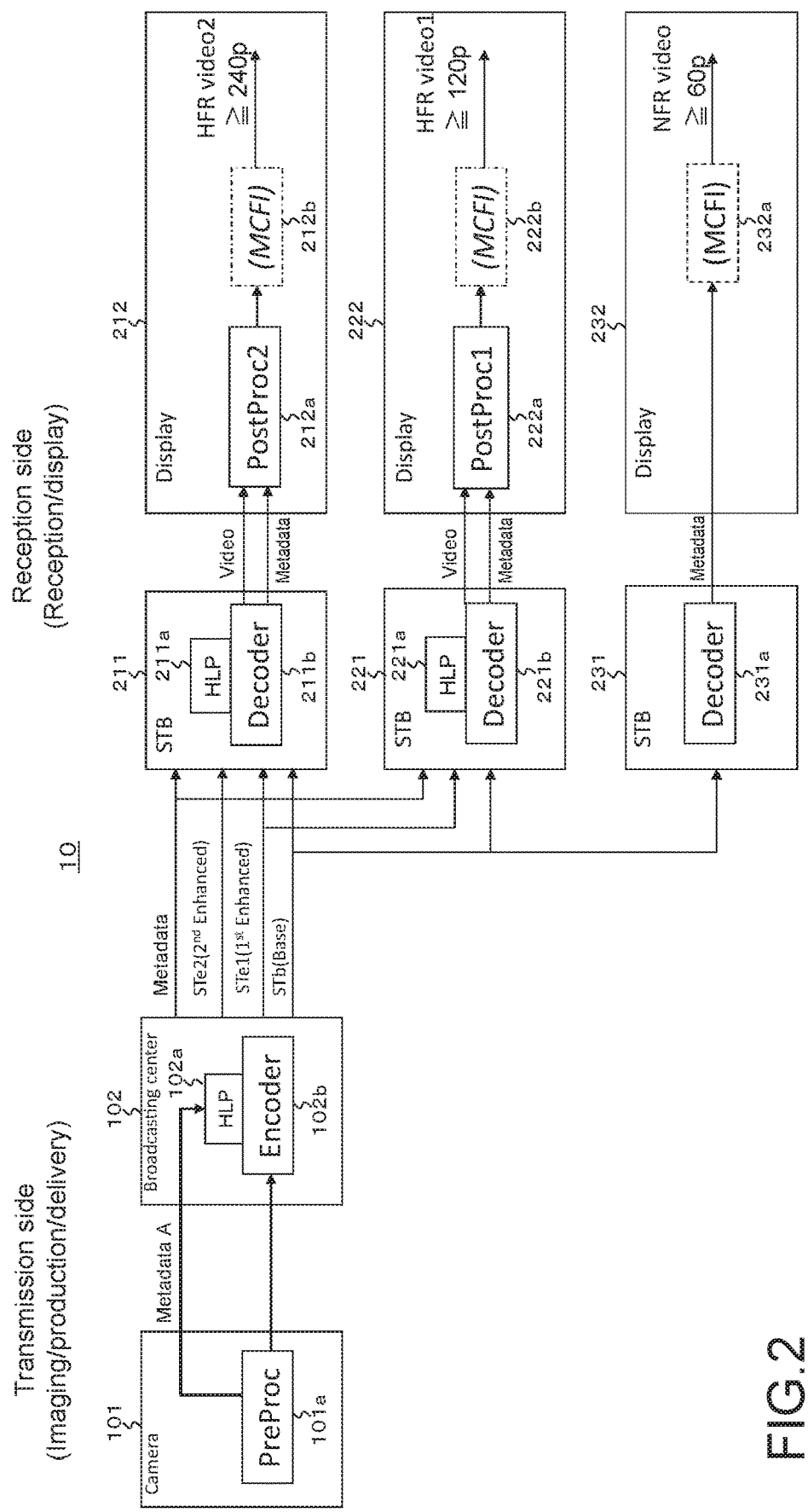
FIG. 2 is a diagram showing a configuration example of a transmission/reception system including a transmission side for imaging/production/delivery and a reception side for reception/display.

FIG. 2 shows a configuration example of a transmission/reception system 10 including a transmission side for imaging/production/delivery and a reception side for reception/display. The transmission side includes a camera 101 and a broadcasting center 102. The camera 101 corresponds to the camera of the drone, the camera of the stadium, or the camera of the studio in FIG. 1B, or the like.

The camera 101 captures image data having a predetermined frame frequency as a material video. A preprocessor 101a of the camera 101 performs mixing processing on the image data having the predetermined frame frequency for each frame. In the mixing processing, image data of a previous frame and/or a subsequent frame is selectively used. In this case, in the preprocessor 101a, down-conversion processing for a frame frequency is also performed as necessary.

A transmission unit (not shown) of the camera 101 transmits packets to the broadcasting center 102, the packets each including divided image data as payload data. The divided image data is obtained by dividing the image data having the predetermined frame frequency, on which the mixing processing described above is performed, into a predetermined number of frames. Further, the transmission unit (not shown) of the camera 101 transmits metadata A to the broadcasting center 102 in association with image data of each frame. The metadata A includes the information regarding the mixing processing.

A reception unit (not shown) of the broadcasting center 102 receives the packets transmitted from the camera 101, and the broadcasting center 102 acquires the image data having the predetermined frame frequency, i.e., a material video on which the mixing processing is performed. Further, the reception unit receives the metadata A transmitted from the camera 101.

A high level parser (HLP) unit 102a of the broadcasting center 102 interprets the metadata A associated with image data of each frame. On the basis of this interpretation, an encoder 102b of the broadcasting center 102 performs hierarchical coding using, for example, high efficiency video coding (HEVC) on the image data having the predetermined frame frequency, i.e., a material video on which the mixing processing is performed. The broadcasting center 102 then acquires a base stream STb, a first enhanced stream STe1, and a second enhanced stream STe2.

In this case, for example, the encoder 102b encodes, among the image data having the predetermined frame frequency, image data of a frame subjected to the mixing processing as image data of a base layer and encodes, among the image data having the predetermined frame frequency, image data of a frame not subjected to the mixing processing as image data of an enhanced layer.

A transmission unit (not shown) of the broadcasting center 102 transmits the base stream STb, the first enhanced stream STe1, and the second enhanced stream STe2. In this case, metadata including the information regarding the mixing processing is also transmitted in association with image data of each frame. For example, the transmission is performed by inserting an SEI message, which is newly defined and includes the metadata, into a "SEIs" portion of an access unit (AU) of each picture (frame).

Note that the example in the figure shows that two enhanced streams of the first enhanced stream STe1 and the second enhanced stream STe2 other than the base stream STb are transmitted, but a case of one enhanced stream or three or more enhanced streams is also conceived.

The reception side includes, for example, a set-top box 211 and a display 212. A reception unit (not shown) of the set-top box 211 receives the base stream STb, the first enhanced stream STe1, the second enhanced stream STe2, and the metadata including the information regarding the mixing processing associated with image data of each stream.

An HLP unit 211a of the set-top box 211 interprets the metadata transmitted in association with image data of each frame. Further, a decoder 211b of the set-top box 211 performs decoding processing on the base stream STb, the first enhanced stream STe1, and the second enhanced stream STe2 and acquires, for example, image data of 240 Hz.

A transmission unit (not shown) of the set-top box 211 transmits the image data of 240 Hz and the metadata corresponding to each frame to the display 212 by using, for example, a digital interface such as a high-definition multimedia interface (HDMI).

A reception unit (not shown) of the display 212 receives the image data of 240 Hz and the metadata corresponding to each frame, which are transmitted from the set-top box 211. On the basis of the metadata, a postprocessor 212a of the display 212 performs inverse mixing processing on the image data of the base layer on which the mixing processing is performed, among the image data of 240 Hz, and acquires the image data before mixing.

Further, the display 212 uses the image data of 240 Hz obtained in the postprocessor 212a as image data for display, without change or after frame interpolation processing is performed in a motion compensated frame insertion (MCFI) unit 212b to increase the frame rate.

Further, the reception side includes, for example, a set-top box 221 and a display 222. A reception unit (not shown) of the set-top box 221 receives the base stream STb, the first enhanced stream STe1, and the metadata including the information regarding the mixing processing associated with image data of each stream.

An HIP unit 221a of the set-top box 221 interprets the metadata transmitted in association with image data of each frame. Further, a decoder 221b of the set-top box 221 performs decoding processing on the base stream STb and the first enhanced stream STe1 and acquires, for example, image data of 120 Hz.

A transmission unit (not shown) of the set-top box 221 transmits the image data of 120 Hz and the metadata corresponding to each frame to the display 222 by using, for example, a digital interface such as an HDMI.

A reception unit (not shown) of the display 222 receives the image data of 120 Hz and the metadata corresponding to each frame, which are transmitted from the set-top box 221. On the basis of the metadata, a postprocessor 222a of the display 222 performs inverse mixing processing on the image data of the base layer on which the mixing processing is performed, among the image data of 120 Hz, and acquires the image data before mixing.

Further, the display 222 uses the image data of 120 Hz obtained in the postprocessor 222a as image data for display, without change or after frame interpolation processing is performed in an MCFI unit 222b to increase the frame rate.

Further, the reception side includes, for example, a set-top box 231 and a display 232. A reception unit (not shown) of the set-top box 231 receives the base stream STb. A decoder 231a of the set-top box 231 performs decoding processing on the base stream STb and acquires, for example, image data of 60 Hz. A transmission unit (not shown) of the set-top box 231 transmits the image data of 60 Hz to the display 232 by using, for example, a digital interface such as an HDMI.

A reception unit (not shown) of the display 232 receives the image data of 60 Hz transmitted from the set-top box 231. The display 232 uses the received image data of 60 Hz as image data for display, without change or after frame interpolation processing is performed in an MCFI unit 232a to increase the frame rate.

Note that the example in the figure shows three systems on the reception side, but the present technology is not limited thereto. For example, the number of systems may change depending on the number of enhanced streams.

Figure 3:
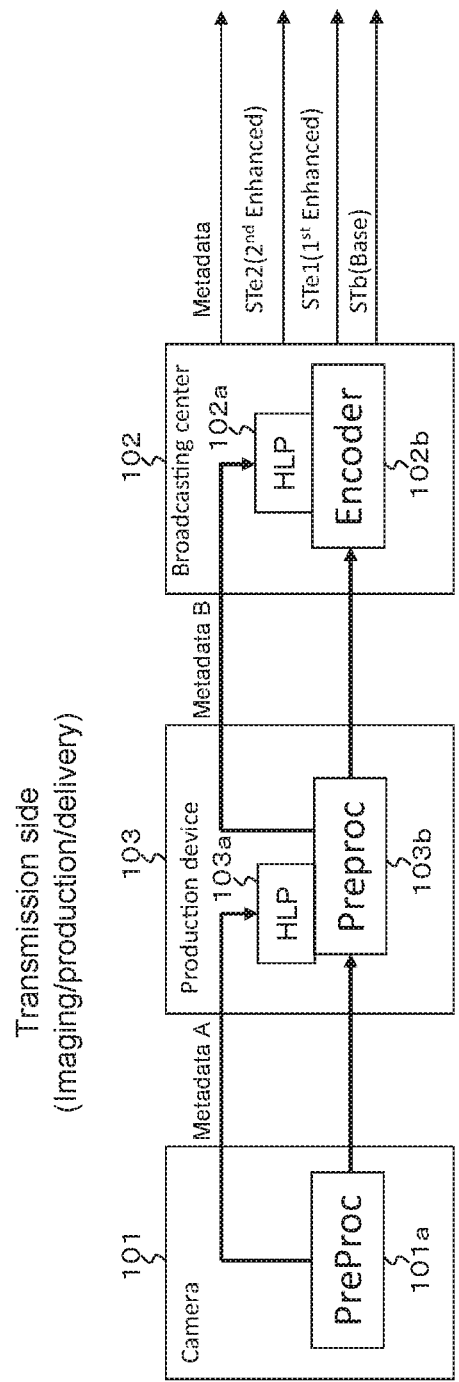
FIG. 3 is a diagram showing another configuration example of the transmission side.

FIG. 3 shows another configuration example of the transmission side. In FIG. 3, portions corresponding to those in FIG. 2 are denoted by identical reference symbols. The transmission side includes a camera 101, a production device 103, and a broadcasting center 102. The camera 101 corresponds to, for example, the camera of a drone or the camera of a stadium in FIG. 1B. The production device 103 corresponds to, for example, the outside broadcasting van or the relay station in FIG. 1B.

The camera 101 captures image data having a predetermined frame frequency as a material video, and a preprocessor 101a performs mixing processing on the image data having the predetermined frame frequency for each frame. In the mixing processing, image data of a previous frame and/or a subsequent frame is selectively used. In this case, in the preprocessor 101a, down-conversion processing for a frame frequency is also performed as necessary.

A transmission unit (not shown) of the camera 101 transmits packets to the production device 103, the packets each including divided image data as payload data. The divided image data is obtained by dividing the image data having the predetermined frame frequency, on which the mixing processing described above is performed, into a predetermined number of frames. Further, the transmission unit (not shown) of the camera 101 transmits metadata A to the production device 103 in association with image data of each frame. The metadata A includes the information regarding the mixing processing.

A reception unit (not shown) of the production device 103 receives the packets transmitted from the camera 101, and the production device 103 acquires the image data having the predetermined frame frequency, i.e., a material video on which the mixing processing is performed. Further, the reception unit receives the metadata A transmitted from the camera 101.

An HLP unit 103a of the production device 103 interprets the metadata A associated with image data of each frame. On the basis of this interpretation, a preprocessor 103b performs mixing processing on the image data having the predetermined frame frequency for each frame. In the mixing processing, image data of a previous frame and/or a subsequent frame is selectively used. The preprocessor 103b then acquires image data having a predetermined frame frequency on which multi-stage, here, two-stage mixing processing is performed. In this case, in the preprocessor 103b, down-conversion processing for a frame frequency is also performed as necessary.

A transmission unit (not shown) of the production device 103 transmits packets to the broadcasting center 102, the packets each including divided image data as payload data. The divided image data is obtained by dividing the image data having the predetermined frame frequency, on which the mixing processing described above is performed, into a predetermined number of frames. Further, the transmission unit (not shown) of the production device 103 transmits metadata B to the broadcasting center 102 in association with image data of each frame. The metadata B includes information regarding the multi-stage mixing processing.

A reception unit (not shown) of the broadcasting center 102 receives the packets transmitted from the production device 103, and the broadcasting center 102 acquires the image data having the predetermined frame frequency, i.e., a material video on which the mixing processing is performed. Further, the reception unit receives the metadata B transmitted from the production device 103.

A HLP unit 102a of the broadcasting center 102 interprets the metadata B associated with image data of each frame. On the basis of this interpretation, an encoder 102b of the broadcasting center 102 performs hierarchical coding using, for example, high efficiency video coding (HEVC) on the image data having the predetermined frame frequency, i.e., a material video on which the mixing processing is performed. The broadcasting center 102 then acquires a base stream STb, a first enhanced stream STe1, and a second enhanced stream STe2.

In this case, the encoder 102b encodes, among the image data having the predetermined frame frequency, image data of a frame subjected to the mixing processing as image data of a base layer and encodes, among the image data having the predetermined frame frequency, image data of a frame not subjected to the mixing processing as image data of an enhanced layer.

A transmission unit (not shown) of the broadcasting center 102 transmits the base stream STb, the first enhanced stream STe1, and the second enhanced stream STe2. In this case, metadata including the information regarding the mixing processing is also transmitted in association with image data of each frame. For example, the transmission is performed by inserting an SEI message, which is newly defined and includes the metadata, into a "SEIs" portion of an access unit (AU) of each picture (frame).

Note that the example in the figure shows that two enhanced streams of the first enhanced stream STe1 and the second enhanced stream STe2 other than the base stream STb are transmitted, but a case of one enhanced stream or three or more enhanced streams is also conceived.

Processing Check

Although not described above, it is also conceived that, in the production device 103, a user determines whether to perform the mixing processing in the preprocessor 103b on the image data transmitted from the former stage, here, the camera 101, after viewing the image quality of the image data on which the mixing processing is performed in the preprocessor 103b.

At that time, there is also a case where the determination is made on the basis of the image quality of a display image of image data, which is obtained by performing inverse mixing processing in the postprocessor after passing through the encoder/decoder, as in actual broadcasting. Further, at that time, there is also a case where the determination is made on the basis of the image quality of a display image of image data on which mixing processing is performed after passing through the encoder/decoder, as in actual broadcasting. Additionally, at that time, there is also a case where the determination is made on the basis of the image quality of a display image of image data on which uncompressed mixing processing is performed without passing through the encoder/decoder.

Figure 4:
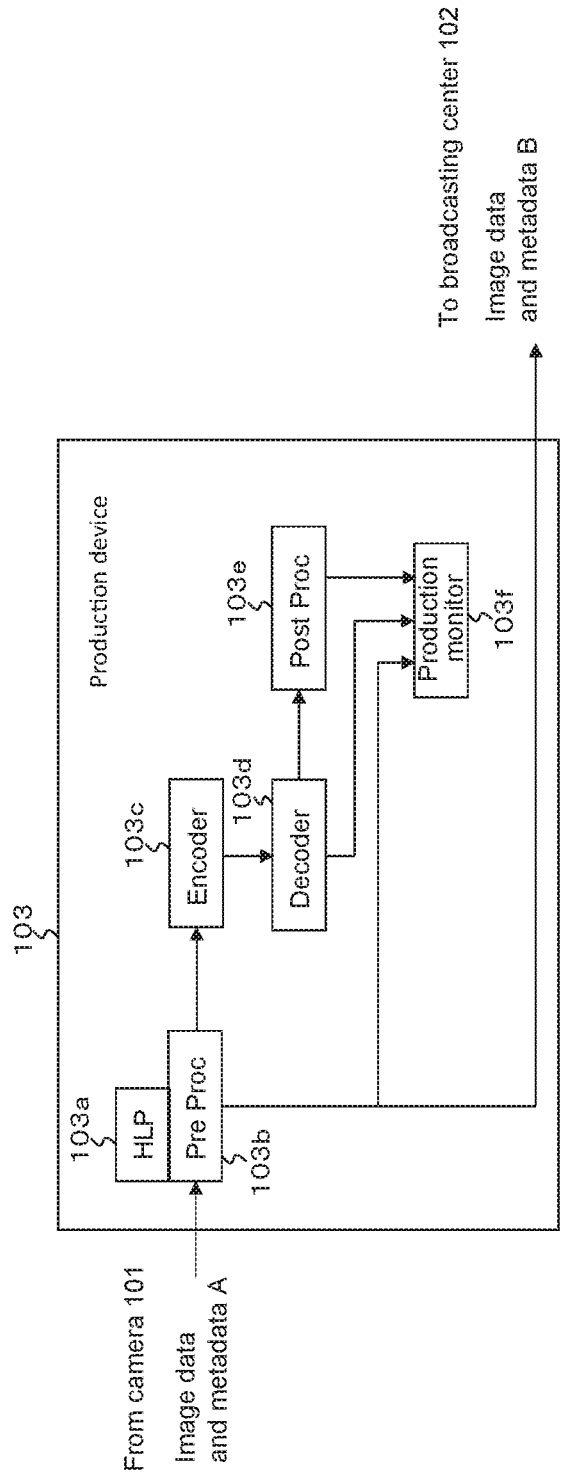
FIG. 4 is a diagram showing a configuration example of a production device that performs processing check.

FIG. 4 shows a configuration example of the production device 103 in such a case. The production device 103 includes, in addition to the HLP unit 103a and the preprocessor 103b, an encoder 103c, a decoder 103d, a postprocessor 103e, and a production monitor 103f.

The image data having the predetermined frequency obtained by performing the mixing processing in the preprocessor 103b is transmitted to the production monitor 103f as first image data. Further, the image data having the predetermined frequency obtained by performing the mixing processing in the preprocessor 103b is transmitted to the production monitor 103f as second image data after encoding by the encoder 103c and decoding by the decoder 103d.

Further, the image data having the predetermined frequency obtained from the decoder 103d is transmitted to the production monitor 103f as third image data after inverse mixing processing is performed in the postprocessor 103e. The inverse mixing processing performed in the postprocessor 103e is performed on the basis of the metadata B output from the preprocessor 103b, though not shown in the figure.

In this configuration example, the user can determine whether the mixing processing is to be performed or not in the preprocessor 103b, by selectively switching the first image data, the second image data, or the third image data and viewing respective display images on the production monitor 103f. Note that, in a case where the mixing processing is not performed in the preprocessor 103b, the image data and the metadata B transmitted from the production device 103 to a subsequent stage, here, the broadcasting center 102, are the same as the image data and the metadata A transmitted from the camera 101 to the production device 103.

Layer Sorting in Hierarchical Coding by Encoder

As described above, for example, the encoder 102b encodes, among the image data having the predetermined frame frequency, image data of a frame subjected to the mixing processing as image data of a base layer, and encodes, among the image data having the predetermined frame frequency, image data of a frame not subjected to the mixing processing as image data of an enhanced layer.

Figure 5:
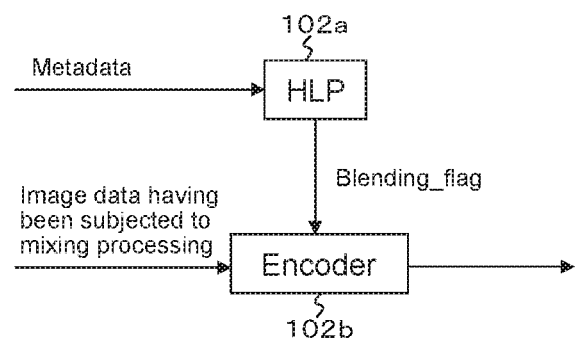
FIG. 5 is a diagram for describing layer sorting in hierarchical coding by an encoder.

The metadata including the information regarding the mixing processing associated with the image data of each frame, which is transmitted together with the image data having the predetermined frame frequency on which the mixing processing is performed by the encoder 102b, includes "Blending_flag" that is information indicating whether the mixing processing is performed on image data of a corresponding frame or not. As shown in FIG. 5, layer sorting processing in the encoder 102b is performed on the basis of "Blending_flag".

Figure 6A:
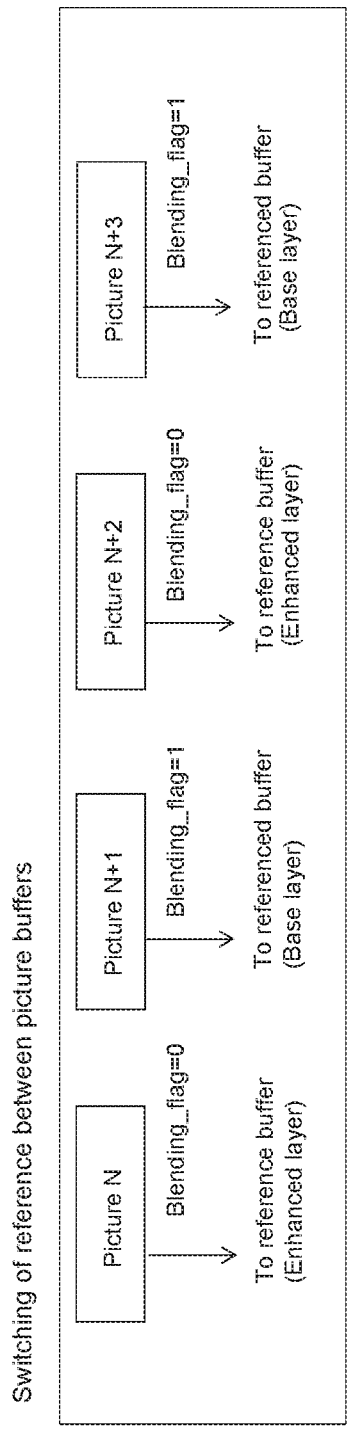
FIGS. 6A and 6B are diagrams for describing the layer sorting in the hierarchical coding by the encoder.

In this case, as shown in FIG. 6A, the encoder 102b switches accumulation to a reference buffer/referenced buffer of the encoder 102b on the basis of "Blending_flag" of a picture (frame) to be input. If "Blending_flag=1", a picture is accumulated in a referenced buffer in encoding. If "Blending_flag=0", a picture is accumulated in a reference buffer in encoding.

Figure 6B:
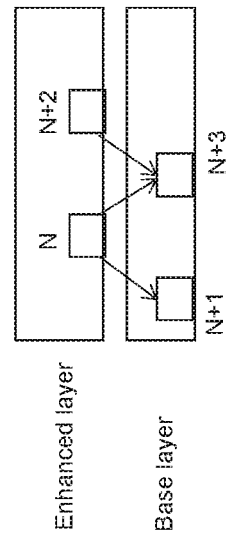

As shown in FIG. 6B, pictures of the base layer in the referenced buffer can be referenced by pictures of the enhanced layer in the reference buffer, and the pictures of the enhanced layer in the reference buffer are not referenced by other pictures.

Shutter Rate at Imaging

Figure 7A:
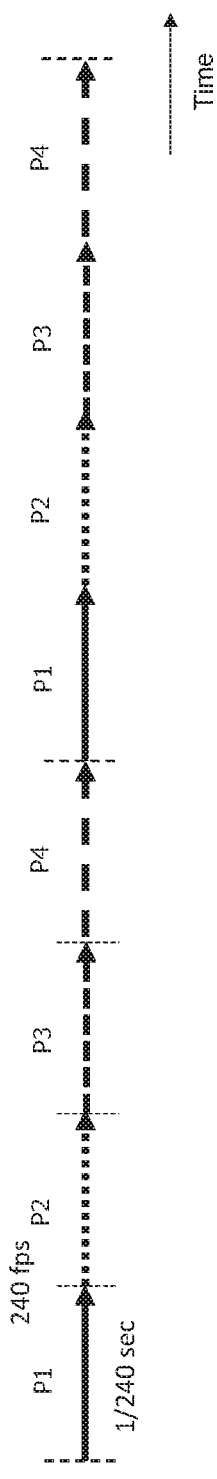
FIGS. 7A and 7B are diagrams for describing a shutter rate at imaging.

A shutter rate at imaging will be described. FIG. 7A shows image data captured at a shutter speed of 1/240 sec at a frame frequency of 240 Hz (240 fps). The image data has a configuration in which four frame sections of P1, P2, P3, and P4 are repeated.

In this case, the shutter is open in all the time of the frame interval of 240 Hz. Thus, a shutter angle (shutter rate) α is 360 degrees (100%) as expressed by the following mathematical expression (1).

$$\alpha = 360*240/240 = 360 \tag{1}$$

Figure 7B:
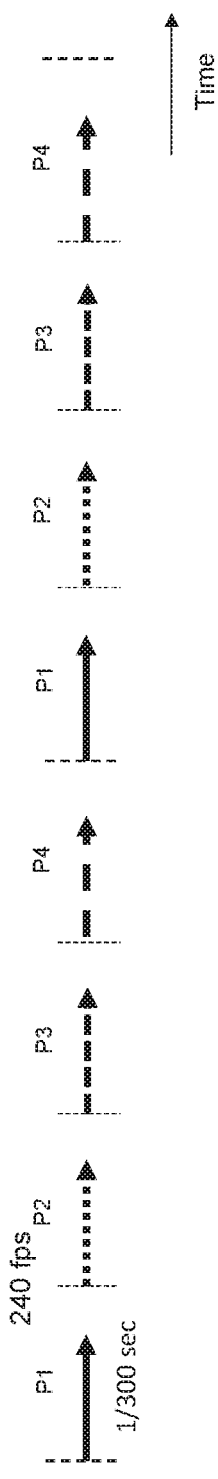

FIG. 7B shows image data captured at a shutter speed of 1/300 sec at a frame frequency of 240 Hz (240 fps). The image data has a configuration in which four frame sections of P1, P2, P3, and P4 are repeated.

In this case, a period during which the shutter is open with respect to the frame interval of 240 Hz is short, i.e., 1/300 sec. Thus, a shutter angle (shutter rate) α is 288 degrees (80%) as expressed by the following mathematical expression (2).

$$\alpha = 360*240/300 = 288 \tag{2}$$

FIG. 8 shows an example of a correspondence relationship between a shutter speed (1/sec), a transmission frame rate (fps), and a shutter angle (degree). In general, the shutter angle (degree) is calculated by the following mathematical expression (3).

$$\text{Shutter angle (degree)} = 360*(\text{transmission frame rate})*(\text{shutter speed}) \tag{3}$$

Mixing Processing

As described above, the mixing processing is performed in order to mitigate degradation of the quality of moving images due to strobing in a receiver that creates a display image by partial decoding. Image data on which the mixing processing is not performed is image data in an incompatible mode, and image data on which the mixing processing is performed is image data in a low-frame-rate compatible mode.

Figure 9:
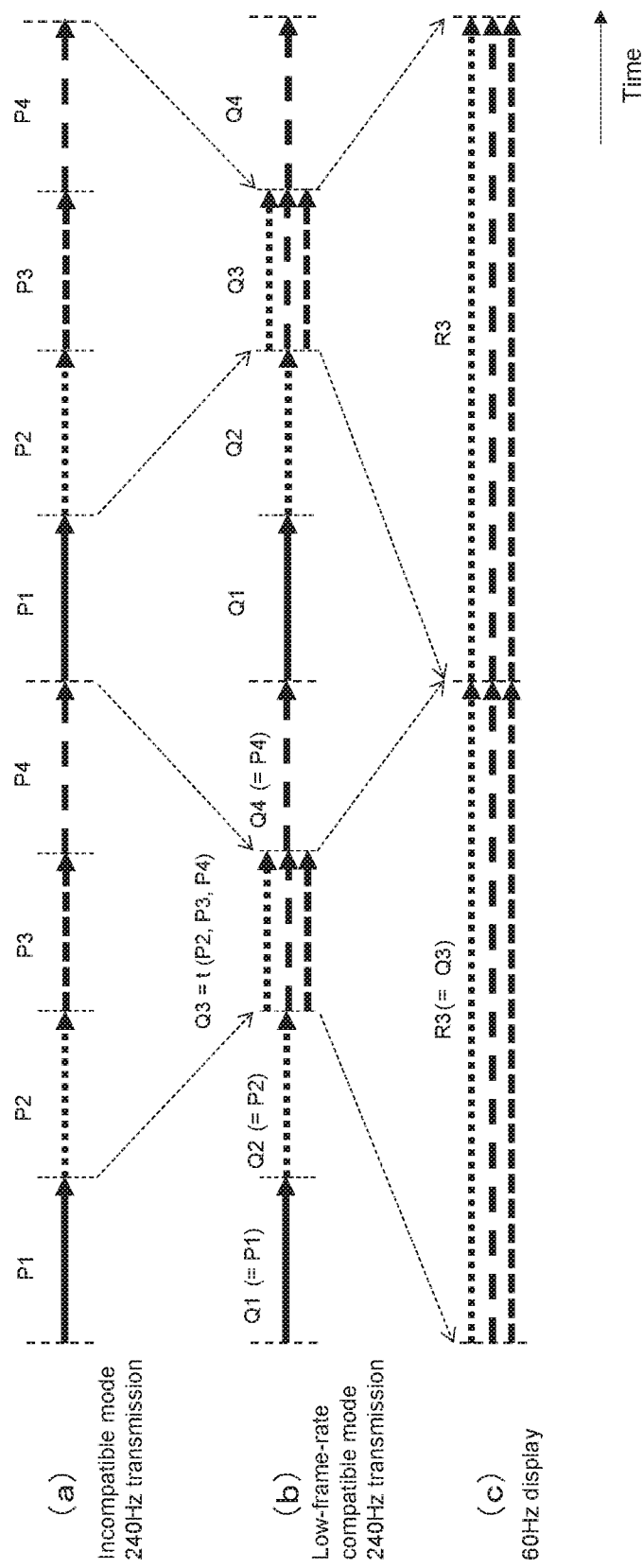
FIG. 9 is a diagram for describing an example of mixing processing.

With reference to FIG. 9, an example of the mixing processing will be described. In FIG. 9, (a) shows image data in an incompatible mode on which the mixing processing is not performed, the image data having a basic format. This image data is image data obtained when imaging is performed at a frame frequency of 240 Hz (240 fps) and at a shutter speed of 1/240 sec. The image data has a configuration in which four frame (picture) sections of P1, P2, P3, and P4 are repeated. A shutter angle (shutter rate) α of each frame in this case 360 degrees (100%) (see FIG. 7A).

In FIG. 9, (b) shows image data of 240 Hz in a low-frame-rate compatible mode on which the mixing processing is performed. The image data has a configuration in which four frame sections of Q1, Q2, Q3, and Q4 are repeated. The image data of each of the frames of Q1, Q2, and Q4 is the same as image data of each of the frames of P1, P2, and P4, respectively. A shutter angle (shutter rate) α of each of the frames of Q1, Q2, and Q4 is 360 degrees (100%).

The image data of the frame of Q3 is mixed image data t (P2, P3, P4) obtained by performing filter operation on the image data of the frames of P2, P3, and P4. In this case, the image data of the frame of Q3 includes pixel elements of the three frames of P2, P3, and P4 mixed using the filter operation. Since a shutter angle (shutter rate) β of the frame of Q3 reflects the pixel elements of the three frames in one frame of 240 Hz, as expressed by the following mathematical expression (4), the shutter angle (shutter rate) β of the frame of Q3 is 360*3 degrees (300%).

$$\beta = 360*240/240*3 = 360*3 \tag{4}$$

In FIG. 9, (c) shows image data obtained when the reception side extracts the image data of the frame of Q3 on which the mixing processing is performed, and then displays such image data at 60 Hz. Image data of a frame of R3 is for displaying the image data of the frame of Q3 at time intervals of 60 Hz. The image data of the frame of R3 includes combined pixel elements of the frames corresponding to the three slots of P2, P3, and P4, out of the four slots of the original 240 Hz, in a time width of 60 Hz. Thus, a shutter angle (shutter rate) γ of the frame of R3 is 270 degrees (75%) as expressed by the following mathematical expression (5).

$$\gamma = 360*60/240*3 = 270 \tag{5}$$

In a case where the image data in the low-frame-rate compatible mode on which the mixing processing is performed, which is shown in (b) of FIG. 9, is transmitted to the reception side, for example, the encoder 102b performs encoding as follows. In other words, the base stream STb contains encoded image data of image data in a 60-Hz hierarchal layer (see image data of frame (picture) of Q3). Further, the first enhanced stream STe1 contains encoded image data of image data in a 120-Hz hierarchal layer (see image data of frame (picture) of Q1). Further, the second enhanced stream Ste2 contains encoded image data of image data in a 240-Hz hierarchal layer (see image data of frames (pictures) of Q2 and Q4).

Note that the example of FIG. 9 shows that the shutter angle (shutter rate) α at imaging as 360 degrees (100%), but another example is also conceived similarly. For example, in a case where α=288 degrees, β=288*3=864 degrees, and γ=288*3⁄4=216 degrees. This applies to not only the example of FIG. 9 but also the following examples of FIG. 10 and FIG. 11.

Figure 10:
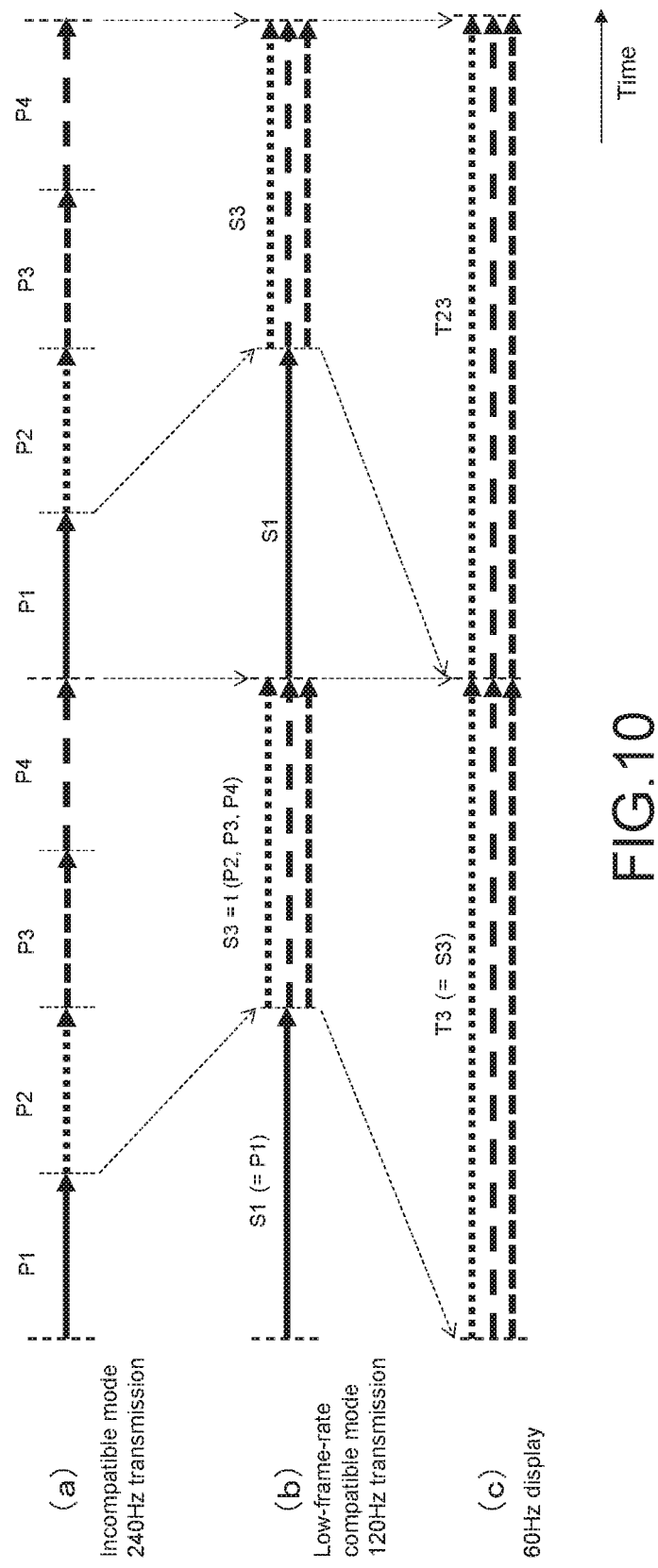
FIG. 10 is a diagram for describing another example of the mixing processing.

With reference to FIG. 10, another example of the mixing processing will be described. In FIG. 10, (a) shows image data in an incompatible mode on which the mixing processing is not performed, the image data having a basic format. This image data is image data obtained when imaging is performed at a frame frequency of 240 Hz (240 fps) and at a shutter speed of 1/240 sec. The image data has a configuration in which four frame (picture) sections of P1, P2, P3, and P4 are repeated. A shutter angle (shutter rate) α of each frame in this case is 360 degrees (100%) (see FIG. 7A).

In FIG. 10, (b) shows image data of 120 Hz in a low-frame-rate compatible mode on which the mixing processing is performed. The image data has a configuration in which two frame sections of S1 and S3 are repeated. The image data of the frame of S1 is the same as the image data of the frame of P1. The frame of S1 has a time width of 120 Hz, which corresponds to a time width including two slots of 240 Hz.

If the image data of the frame of S1 includes pixel elements of the two slots of P1 and P2, the shutter angle (shutter rate) is 360 degrees (100%). However, since the image data of the frame of S1 includes only the pixel element of the slot of P1, the shutter angle (shutter rate) of the frame of S1 is 180 degrees (50%).

The image data of the frame of S3 is mixed image data t (P2, P3, P4) obtained by performing filter operation on the image data of the frames of P2, P3, and P4. The frame of S3 has a time width of 120 Hz, which corresponds to a time width including two slots of 240 Hz. If the image data of the frame of S3 includes the pixel elements of two slots of P3 and P4, the shutter angle (shutter rate) is 360 degrees (100%).

However, the image data of the frame of S3 includes the pixel elements of three slots, i.e., the slot of P2 in addition to the two slots of P3 and P4. Thus, the shutter angle (shutter rate) β of the frame of S3 is 540 degrees (150%) as expressed by the following mathematical expression (6).

$$\beta = 360 * 120/240 * 3 = 540 \qquad (6)$$

In FIG. 10, (c) shows image data obtained when the reception side extracts the image data of the frame of S3 on which the mixing processing is performed, and then displays such image data at 60 Hz. Image data of a frame of T3 is for displaying the image data of the frame of S3 at time intervals of 60 Hz. The image data of the frame of T3 includes combined pixel elements of the frames corresponding to the three slots of P2, P3, and P4, out of the four slots of the original 240 Hz, in a time width of 60 Hz. Thus, a shutter angle (shutter rate) γ of the frame of T3 is 270 degrees (75%) as expressed by the following mathematical expression (7).

$$\gamma = 360 * 60/240 * 3 = 270 \qquad (7)$$

In a case where the image data in the low-frame-rate compatible mode on which the mixing processing is performed, which is shown in (b) of FIG. 10, is transmitted to the reception side, for example, the encoder 102b performs encoding as follows. In other words, the base stream STb contains encoded image data of image data in a 60-Hz hierarchal layer (see image data of frame (picture) of S3). Further, the first enhanced stream STe1 contains encoded image data of image data in a 120-Hz hierarchal layer (see image data of frame (picture) of S1). In this case, the second enhanced stream Ste2 is not generated.

Figure 11:
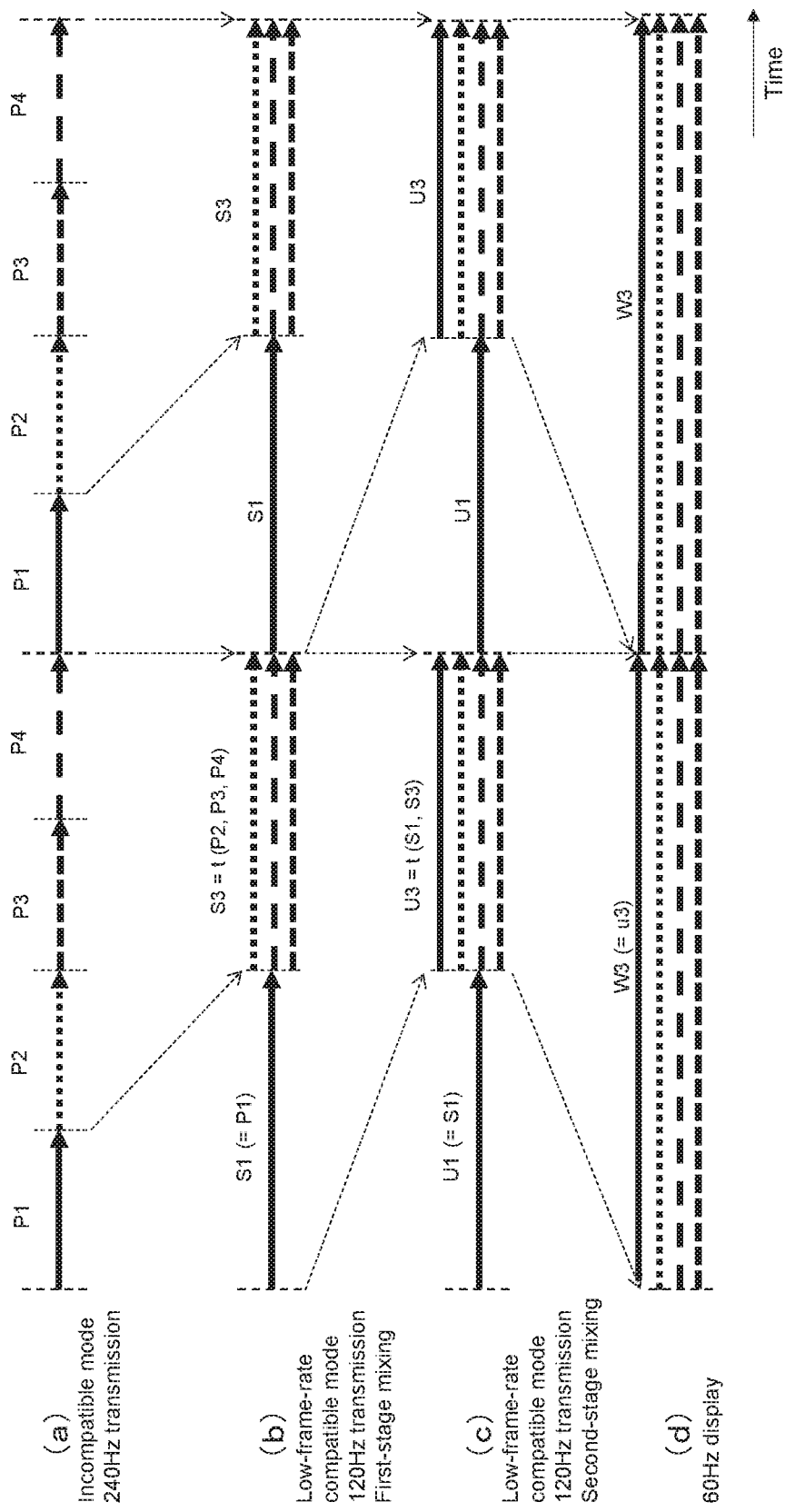
FIG. 11 is a diagram for describing still another example of the mixing processing.

With reference to FIG. 11, still another example of the mixing processing will be described. In FIG. 11, (a) shows image data in an incompatible mode on which the mixing processing is not performed, the image data having a basic format. This image data is image data obtained when imaging is performed at a frame frequency of 240 Hz (240 fps) and at a shutter speed of 1/240 sec. The image data has a configuration in which four frame (picture) sections of P1, P2, P3, and P4 are repeated. A shutter angle (shutter rate) α of each frame in this case is 360 degrees (100%) (see FIG. 7A).

In FIG. 11, (b) shows image data of 120 Hz in a low-frame-rate compatible mode on which first-stage mixing processing is performed. Although detailed description will be omitted, such image data is the same as the image data shown in (b) of FIG. 10.

In FIG. 11, (c) shows image data of 120 Hz in a low-frame-rate compatible mode on which second-stage mixing processing is performed. The image data has a configuration in which two frame sections of U1 and U3 are repeated. The image data of the frame of U1 is the same as the image data of the frame of S1.

The image data of the frame of U3 is mixed image data t (S1, S3) obtained by performing filter operation on the image data the frames of S1 and S3. The frame of U3 has a time width of 120 Hz, which corresponds to a time width including two slots of 240 Hz. If the image data of the frame of U3 includes the pixel elements of two slots of P3 and P4, the shutter angle (shutter rate) is 360 degrees (100%).

However, the image data of the frame of U3 includes the pixel elements of four slots, i.e., the slots of P1 and P2 in addition to the two lots of P3 and P4. Thus, the shutter angle (shutter rate) β of the frame of U3 is 360*2 degrees (200%) as expressed by the following mathematical expression (8).

$$\beta = 360 * 120/240 * 4 = 360 * 2 \qquad (8)$$

In FIG. 11, (d) shows image data obtained when the reception side extracts the image data of the frame of U3 on which the mixing processing is performed, and then displays such image data at 60 Hz. Image data of a frame of W3 is for displaying the image data of the frame of U3 at time intervals of 60 Hz. The image data of the frame of W3 includes combined pixel elements of the frames corresponding to all the four slots of the original 240 Hz, in a time width of 60 Hz. Thus, a shutter angle (shutter rate) γ of the frame of W3 is 360 degrees (100%) as expressed by the following mathematical expression (9).

$$\gamma = 360 * 60/240 * 4 = 360 \qquad (9)$$

In a case where the image data in the low-frame-rate compatible mode on which the mixing processing is performed, which is shown in (c) of FIG. 11, is transmitted to the reception side, for example, the encoder 102b performs encoding as follows. In other words, the base stream STb contains encoded image data of image data in a 60-Hz hierarchal layer (see image data of frame (picture) of U3). Further, the first enhanced stream STe1 contains encoded image data of image data in a 120-Hz hierarchal layer (see image data of frame (picture) of U1). In this case, the second enhanced stream Ste2 is not generated.

Transmission of Metadata

As described above, on the transmission side (imaging/production/delivery) of FIG. 2, when the image data having the predetermined frame frequency on which the mixing processing is performed is to be packetized and transmitted to the next stage, metadata including information regarding the mixing processing is also to be transmitted in association with image data of each frame.

Here, as derived above, metadata is to be transmitted by, for example, inserting the metadata into a payload header of a packet including at least the top of the image data of each frame (first method). Alternatively, metadata is to be transmitted by using a metadata-dedicated packet associated with a packet including the image data of each frame (second method). Note that the metadata transmission method is not limited to the first method and the second method. Hereinafter, details of the first method and the second method will be described.

First Method

The first method is to transmit metadata by inserting the metadata into a payload header of a packet including at least the top of the image data of each frame.

Figure 12:
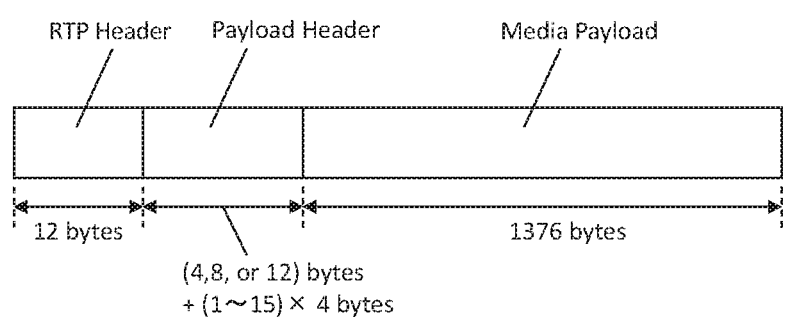
FIG. 12 is a diagram showing an example of a packet.

FIG. 12 shows an example of a packet. This is an example standardized as "ST 2022-6 Transport of High Bit Rate Media Signals over IP Networks (HBRMT)". This standard is for IP transmission of SDI signals. In the standard, Society of Motion Picture and Television Engineers (SBPTE) prescribe IP packets. In the case of this standard, video and audio data are mixed and inserted in the payload.

In this standard, an SDI stream (picture data) is sectioned in 1376 bytes each, to obtain media payloads. A payload header is added to each of the media payloads, and an RTP header of 12 bytes is further added thereto and encapsulated into an RTP packet. In the "SMPTE ST 2022-6" standard, the IP transmission by 3G-SDI for transmitting a 1080p-video to an uncompressed stream is prescribed. Note that actually an UDP header is added to the RTP packet, and an IP packet is further added thereto, thus transmitting the resultant packet as an IP packet.

FIG. 13 shows a structural example (Syntax) of the RTP header. FIG. 14 shows the contents (Semantics) of main information in that structural example. A version number (V) indicates a version of the RTP, and the current version is 2. A padding bit (P) indicates that the payload is padded (1) or not padded (0).

A header extension bit (X) indicates that the extension header is added (1) or not added (0). CSRC count (CC) indicates the length of a CSRC list. In a case where the payload is combination of a plurality of media streams, an SSRC list of each media stream is stored as a contributing source (CSRC) list.

A marker bit (M) indicates the occurrence of an important event defined by an RTP profile to be used. The marker bit (M) is used for indicating the start, restart, end, or the like of the stream. A payload type (PT) is used for identifying the medium type of payload data and indicates a media encoding method defined in RFC 3551. For example, the value "98" indicates "ST2022-6", "New_Value1" newly defined indicates "ST2110-20", and "New_Value2" newly defined indicates "metadata".

A sequence number is an unsigned 16-bit integer value that is incremented by 1 each time the packet is transmitted. In general, the initial value is set at random. The sequence number is used to detect missing packets or used for alignment. A time stamp indicates an instant at which the top of the payload data is sampled. The time stamp is used for reproduction of media. The value of the time stamp is incremented for each packet at transmission of the RTP packets.

A synchronization source (SSRC) identifier an SSRC of a packet transmitter.

FIG. 15 shows a structural example (Syntax) of the payload header. FIG. 16 shows the contents (Semantics) of main information in the structural example. This payload header is information for specifying that reproduction of contents to be transmitted by the payload of the packet can be performed in synchronization with the reception side.

A 4-bit field of "Ext" represents the number of extension words (1 word in 4 bytes) of the payload header. In a 1-bit field of "F", "1" indicates that a video format is included, and "0" indicates information other than a video, such as metadata. In a case where information is other than a video, the values of the following elements, "FRcount", "R", "FRAME", and "FRATE" do not have meanings.

In a 3-bit field of "VSID", "0" indicates "primary", and "1" indicates "protect". An 8-bit field of "FRcount" indicates a value increased for each video frame. A 2-bit field of "R" indicates reference of a video timestamp. "00" indicates "not locked", "01" indicates "UTC", and "10" indicates "private reference".

A 2-bit field of "S" indicates that the payload is scrambled or not. "00" indicates that scrambling is not performed. A 3-bit field of "FEC" indicates the type of an error-correcting code to be used. "000" indicates "none", "001" indicates "column", and "010" indicates "row&column".

A 4-bit field of "CF" indicates a clock frequency of the video signal. "0x1" indicates 27 MHz. A 4-bit field of "MAP" indicates the type of an SDI stream. An 8-bit field of "FRAME" specifies a combination of a scanning method for the video signal, the number of pixels, and the like.

An 8-bit field of "FRATE" indicates a frame frequency of the video signal. A 4-bit field of "SAMPLE" indicates the chroma sampling structure of the video signal. A 32-bit field of "Video timestamp" is present when the value of "CF" is larger than 0, and is the time stamp for video signal synchronization between transmission and reception. The accuracy thereof is indicated by the value specified by the clock frequency of the video signal.

In such a payload header, when the value of "Ext" is larger than 0, the number of fields of "Header extension" is the number of words indicated by the value of "Ext". In this field, information of "Extension type" indicating an extension type is also included. In the first method, "shutter_blendng ( )", which is metadata including information regarding mixing processing is inserted into the field of "Header extension".

FIG. 17 shows a structural example (Syntax) of "shutter_blending ( )". FIG. 18 shows the contents (Semantics) of main information in that structural example. An 8-bit field of "metadata type" indicates a metadata type. In a case of "0x0A", an extension region is defined as in this syntax/semantics.

An 8-bit field of "shutter_blending_length" represents a byte size from the next element. An 8-bit field of "video_stream_id" indicates a target video stream ID and is used only when used outside of the video packet.

A 4-bit field of "reference_shutter_speed_code" is a code value of a reference shutter speed (camera shutter speed mainly at capturing). For example, "0x1" indicates ¹⁄₂₄ sec, "0x2" indicates ¹⁄₂₅ sec, "0x3" indicates ¹⁄₃₀ sec, "0x4" indicates ¹⁄₅₀ sec, "0x5" indicates ¹⁄₆₀ sec, "0x6" indicates ¹⁄₁₀₀ sec, "0x7" indicates ¹⁄₁₂₀ sec, "0x8" indicates ¹⁄₁₈₀ sec, "0x9" indicates ¹⁄₂₀₀ sec, and "0xA" indicates ¹⁄₂₄₀ sec.

A 4-bit field of "number_of_blend_stages" indicates the number of stages of mixing processing. The value thereof is 1 or more. The following elements repeatedly appear in number corresponding to the number of stages.

A 4-bit field of "reference_framerate_code" is a code value of a reference frame rate (=frame rate of picture as mixing processing target). For example, "0x1" indicates 24 fps, "0x2" indicates 25 fps, "0x3" indicates 30 fps, "0x4" indicates 50 fps, "0x5" indicates 60 fps, "0x6" indicates 100 fps, "0x7" indicates 120 fps, "0x8" indicates 200 fps, and "0x9" indicates 240 fps.

A 4-bit field of "current_framerate_code" is a code value of the current frame rate (=frame rate of picture after mixing processing). For example, "0x1" indicates 24 fps, "0x2" indicates 25 fps, "0x3" indicates 30 fps, "0x4" indicates 50 fps, "0x5" indicates 60 fps, "0x6" indicates 100 fps, "0x7" indicates 120 fps, "0x8" indicates 200 fps, and "0x9" indicates 240 fps.

A 1-bit field of "blending_flag" is a blend flag indicating that the mixing processing is performed or not. "1" indicates that the mixing processing is performed, and "0" indicates that the mixing processing is not performed. When the blend flag is "1", the following elements are present.

A 2-bit field of "blend_targets_code" indicates a mixing processing target. It indicates that a picture to be mixed with the current picture at the reference frame rate is any of a previous picture, a subsequent picture, or both of a previous picture and a subsequent picture with respect to the current picture. For example, "10" indicates "previous picture", "01" indicates "subsequent picture", and "11" indicates "both of previous and subsequent pictures".

A 4-bit field of "blend_coefficients_code" is a code value indicating a blend ratio (filter operation coefficient ratio at mixing). A value of the larger ratio is set as a weighting coefficient for the current picture, and a value of the smaller ratio is set as a weighting coefficient for previous and subsequent mixing target pictures. For example, "0x1" indicates "1:1", "0x2" indicates "2:1", "0x3" indicates "4:1", and "0x4" indicates "1:2:1".

Specific Example of Metadata

First, description will be given on a specific example of metadata in a case where the image data in the low-frame-rate compatible mode on which the mixing processing is performed, which is shown in (b) of FIG. 9, is transmitted to the reception side. FIG. 19A shows a specific example of metadata (metadata A) transmitted in association with the image data of each of the frames of Q1, Q2, and Q4. In this case, the reference shutter speed is ⅟240 sec, the reference frame rate is 240 fps, the current frame rate is 240 fps, and the blend flag is "0".

In this case, on the reception side, it is found from the reference shutter speed and the reference frame rate that the original shutter angle is 360 degrees (100%). Further, since the current frame rate is same as the reference frame rate, it is found that the shutter angle of that frame is 360 degrees (100%). Further, it is found from the blend flag that the mixing processing is not performed on the image data of those frames.

FIG. 19B shows a specific example of metadata (metadata A) transmitted in association with the image data of the frame of Q3. In this case, the reference shutter speed is ⅟240 sec, the reference frame rate is 240 fps, the current frame rate is 240 fps, the blend flag is "1", mixing processing targets are both of a previous picture and a subsequent picture, and the blend ratio is 1:2:1.

In this case, on the reception side, it is found from the reference shutter speed and the reference frame rate that the original shutter angle is 360 degrees (100%). Further, it is found from the mixing processing targets that the image data of that frame is data obtained by mixing three pictures at the ratio of 1:2:1 by using both of the previous picture and the subsequent picture as mixing processing targets. By the mixing processing, the shutter angle is converted into 360*3=1080 degrees (300%). Since the current frame rate is the same as the reference frame rate, it is found that the shutter angle of that frame is 360 degrees (100%).

Next, description will be given on a specific example of metadata in a case where the image data in the low-frame-rate compatible mode on which the mixing processing is performed, which is shown in (b) of FIG. 10, is transmitted to the reception side. FIG. 20A shows a specific example of metadata (metadata A) transmitted in association with the image data of the frame of S1. In this case, the reference shutter speed is ⅟240 sec, the reference frame rate is 240 fps, the current frame rate is 120 fps, and the blend flag is "0".

In this case, on the reception side, it is found from the reference shutter speed and the reference frame rate that the original shutter angle is 360 degrees (100%). Further, since a time axis of the current frame rate is twice a time axis of the reference frame rate, it is found that the shutter angle of that frame is 180 degrees (50%). Further, it is found from the blend flag that the mixing processing is not performed on the image data of that frame.

FIG. 20B shows a specific example of metadata (metadata A) transmitted in association with the image data of the frame of S3. In this case, the reference shutter speed is ⅟240 sec, the reference frame rate is 240 fps, the current frame rate is 120 fps, the blend flag is "1", mixing processing targets are both of a previous picture and a subsequent picture, and the blend ratio is 1:2:1.

In this case, on the reception side, it is found from the reference shutter speed and the reference frame rate that the original shutter angle is 360 degrees (100%). Further, it is found from the mixing processing targets that the image data of that frame is data obtained by mixing three pictures at the ratio of 1:2:1 by using both of the previous picture and the subsequent picture as mixing processing targets. By the mixing processing, the shutter angle is converted into 360*3=1080 degrees (300%). Since the time axis of the current frame rate is twice the time axis of the reference frame rate, it is found that the shutter angle of that frame is 540 degrees (150%).

Figure 21:
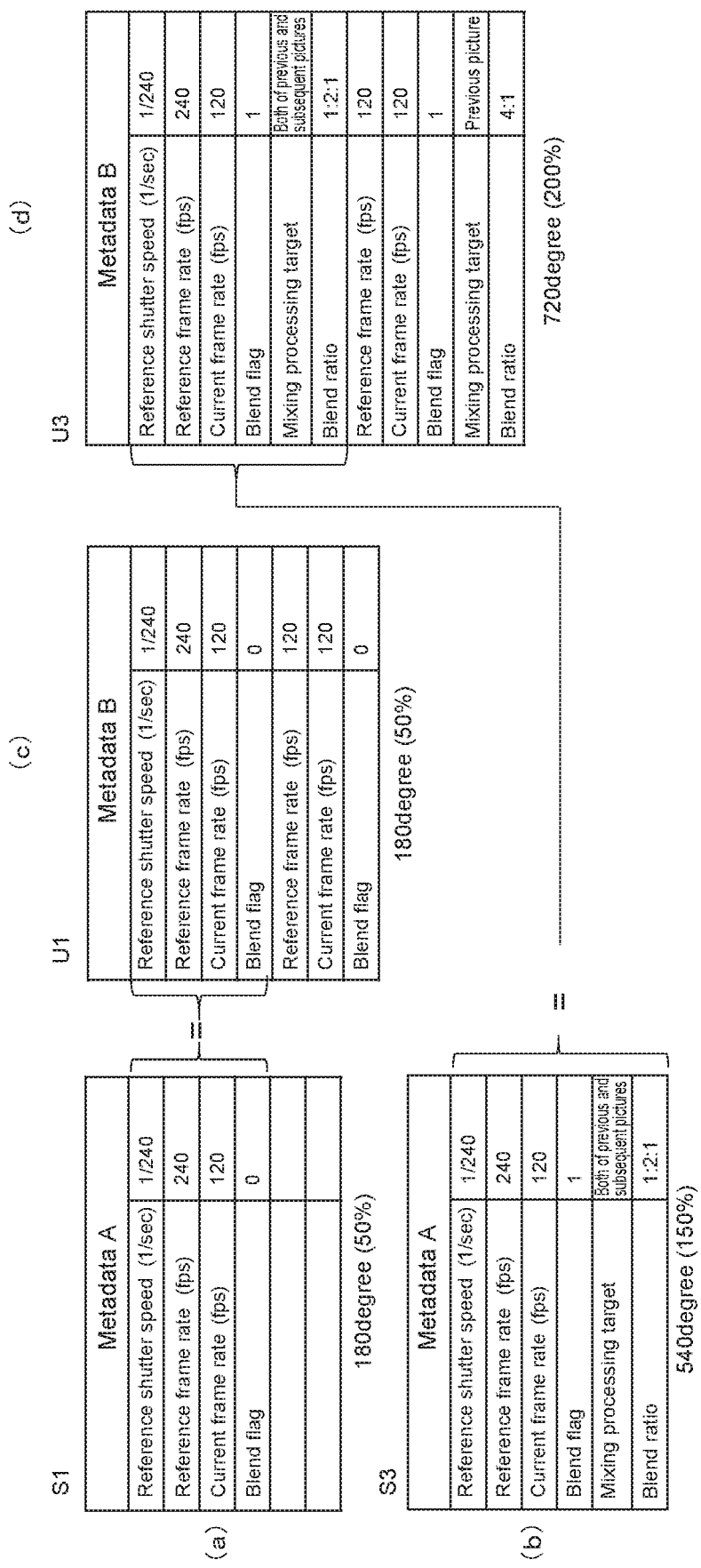
FIG. 21 is a diagram for describing a specific example of metadata.

Next, description will be given on a specific example of metadata in a case where the image data in the low-frame-rate compatible mode on which two-stage mixing processing is performed, which is shown in (c) of FIG. 11, is transmitted to the reception side. (a) and (b) of FIG. 21 show specific examples of the metadata (metadata A) transmitted in associated with the image data of the respective frames of S1 and S3 in (b) of FIG. 11. Although detailed description will be omitted, the description on FIGS. 20A and 20B apply to such metadata (metadata A).

In FIG. 21, (c) shows a specific example of metadata (metadata B) transmitted in association with the image data of the frame of U1. Such metadata (metadata B) contains information regarding first-stage mixing processing shown in (a) of FIG. 21 and also information regarding second-stage mixing processing. Regarding the second-stage mixing processing, the reference frame rate is 120 fps, the current frame rate is 120 fps, and the blend flag is "0".

In this case, on the reception side, since the current frame rate is the same as the reference frame rate, it is found that the shutter angle of that frame is 360 degrees (100%) like the shutter angle of the frame of S1. Further, it is found from the blend flag that the mixing processing is not performed on the image data of that frame.

In FIG. 21, (d) shows a specific example of metadata (metadata B) transmitted in association with the image data of the frame of U3. Such metadata (metadata B) contains information regarding first-stage mixing processing shown in (b) of FIG. 21 and also information regarding second-stage mixing processing. Regarding the second-stage mixing processing, the reference frame rate is 120 fps, the current frame rate is 120 fps, the blend flag is "1", the mixing processing target is a previous picture, and the blend ratio is 4:1.

In this case, it is found from the mixing processing target that the image data of that frame is data obtained by mixing two pictures at the ratio of 4:1 by using the previous picture as a mixing processing target. By the mixing processing, it is found that the shutter angle of that frame is 540+180=720 degrees (200%).

Figure 22:
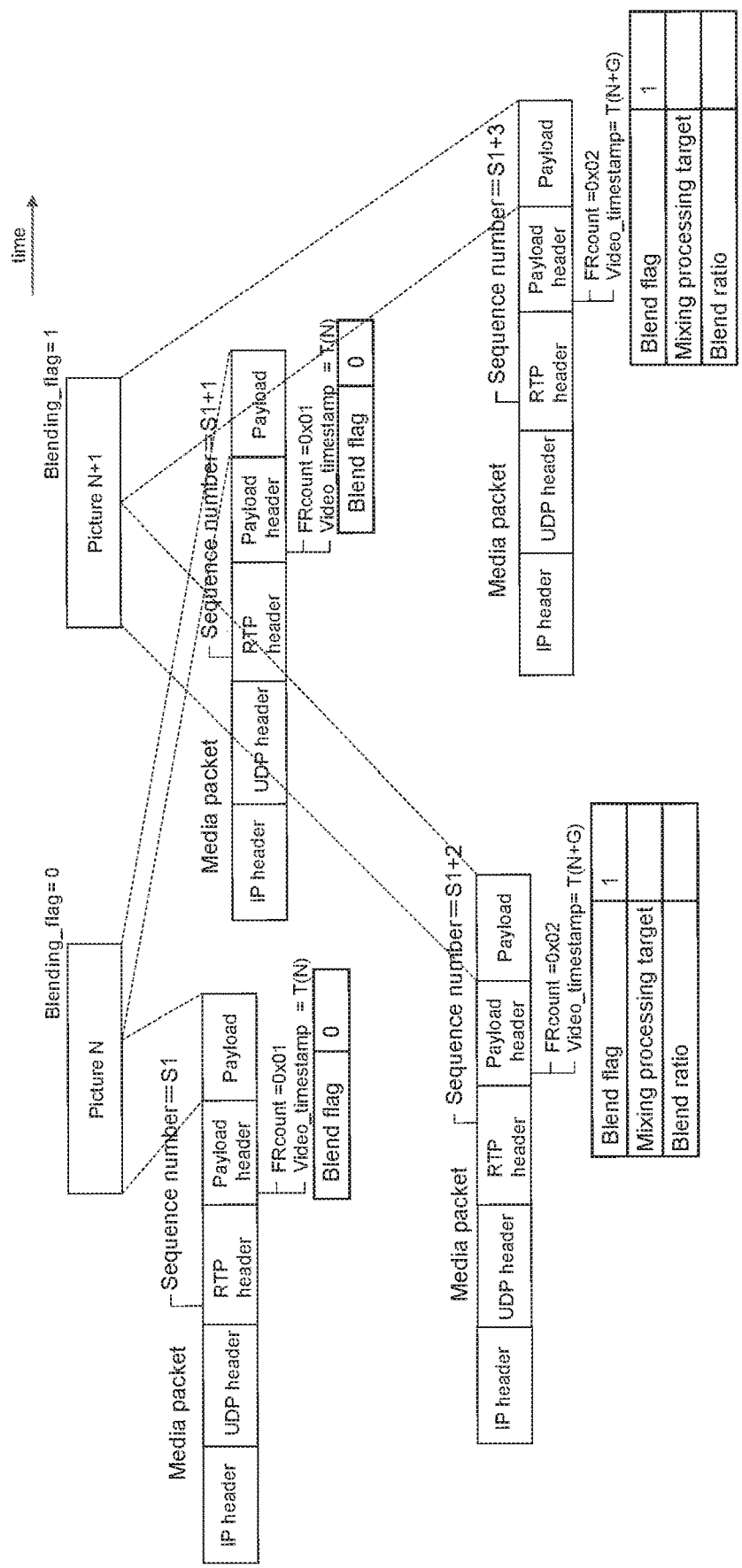
FIG. 22 is a diagram showing an example in which pictures are transmitted in a plurality of packets (media packets) through RTP transmission.

FIG. 22 shows an example in which pictures are transmitted in a plurality of packets (media packets) through the RTP transmission. This example shows a state where a picture is divided into two RTP packets, but the present technology is not limited thereto. For example, a plurality of lines of pictures may be transmitted in one packet, and one picture may be transmitted in a plurality of packets. Further, this example shows that metadata is inserted into the payload header of all of the packets, but it is sufficient if metadata is inserted into the payload header of a packet including at least the top of image data of each frame. Note that only the video is illustrated in this example, but actually the ST2022-6 permits mixture of video and audio data.

Second Method

The second method is to transmit metadata by using a metadata-dedicated packet associated with a packet including image data of each frame.

Figure 23:
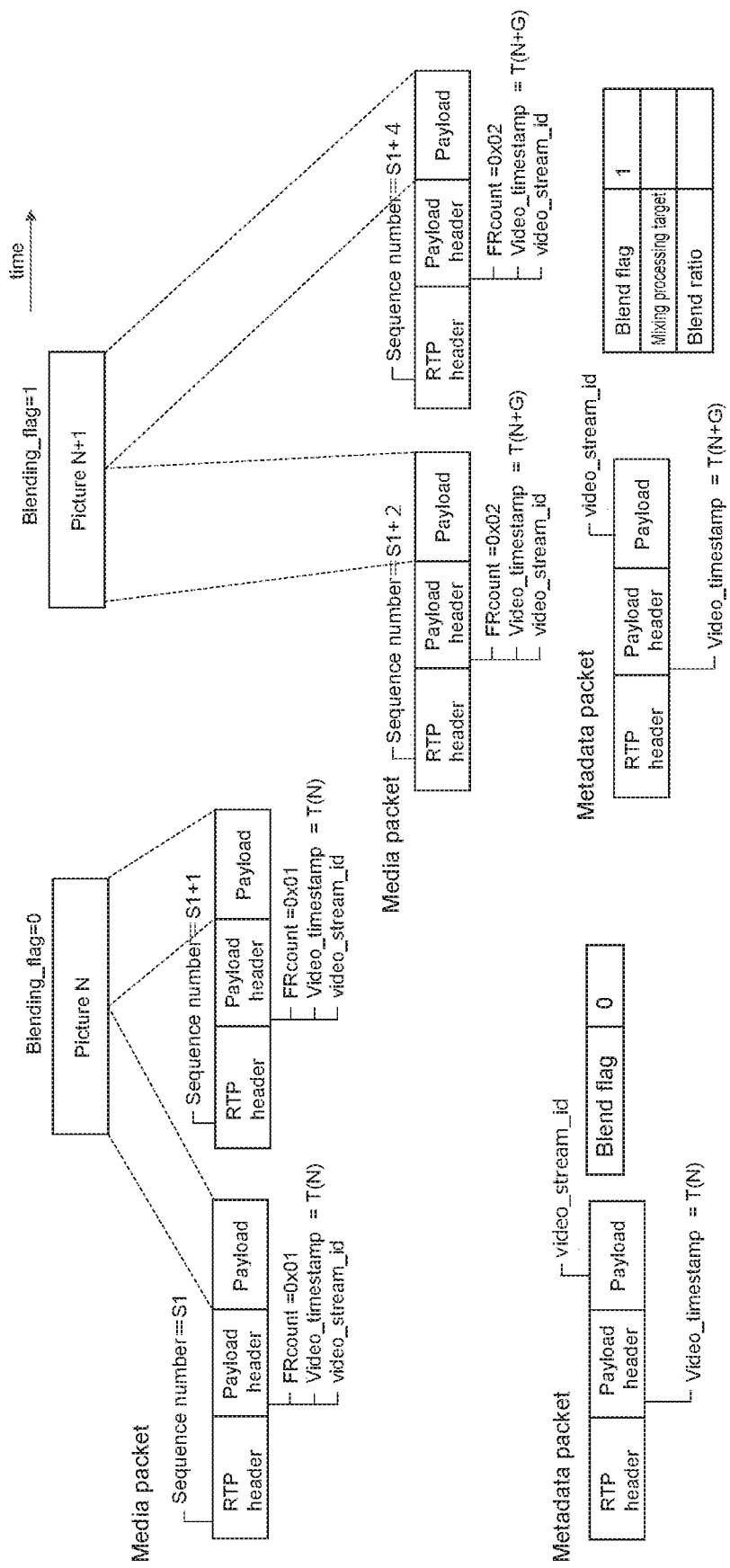
FIG. 23 is a diagram showing another example in which pictures are transmitted in a plurality of packets (media packets) through RTP transmission.

FIG. 23 shows an example in which pictures are transmitted in a plurality of packets (media packets) through the RTP transmission, like FIG. 22. Note that, for the purpose of simplifying the drawings, the illustration of a UDP header and an OP header is omitted in this example.

In the example of FIG. 23, metadata packets are present in addition to the media packets. In the second method, the metadata packet is newly defined, and using the metadata packet, metadata including information regarding mixing processing is transmitted in association with each frame. In this case, a target video packet of the metadata is linked by "video_stream_id". Further, target pictures are synchronized by "Video_timestamp".

FIG. 24 shows a structural example (Syntax) of the payload header in this case. In the payload header, "Video_stream_id" is newly defined using a reserve region, for example, "EMT-RESERVE". The "video_stream_id" has a value uniquely determined in a program distribution, and can be caused to cooperate with another distribution packet (see FIG. 23).

Note that, although detailed description will be omitted, the structure other than the payload header is similar to the structural example shown in FIG. 15. Note that, in this case, the metadata is not inserted into the payload header. Note that "Video_timestamp" is present in the payload header.

The metadata is delivered in the payload of an RTP packet different from the video. The metadata can be synchronized and associated with each picture of a target video by "video_stream_id" and "Video_timestamp". In this case, "New_value2" is entered in the payload type (PT) of the RTP header, and "0" is entered in the "F" of the payload header, which indicates that the payload is not a video. The format data of "shutter_blending ( )" is inserted into the payload region as it is and then transmitted.

FIG. 25 shows a structural example (Syntax) of a payload header and a payload of the metadata packet. The payload header region includes a 32-bit field of "metadata start word" that is identification information of a metadata packet, and a 32-bit field of "Video_timestamp". Then, "shutter_blending ( )" (see FIG. 17) that is metadata including information regarding mixing processing is inserted into the payload region. The "shutter_blending ( )" includes "video_stream_id".

As described above, on the transmission side (imaging/production/delivery) of the transmission/reception system 10 shown in FIGS. 2 and 3, when the image data having a predetermined frame frequency on which the mixing processing is performed is packetized and transmitted to the next stage, metadata including information regarding mixing processing is also transmitted in association with image data of each frame. Thus, the image data on which the mixing processing is performed can be favorably handled on the reception side, for example, at the transmission of materials of the image data.

2. Modified Example

Note that, in the embodiment described above, the packet containing image data (video data) has been described by using a packet of the "ST 2022-6" standard as an example. However, the present technology is similarly applicable to a case where the packet containing image data is another packet, for example, a packet of the "ST 2110-20" standard. In a case of the packet of the "ST 2110-20" standard, only a video is inserted into the payload.

Further, a suitable embodiment of the present disclosure has been described in details with reference to the accompanying drawings, while the technical range of the present disclosure is not limited to such examples. It is apparent that a person having ordinary skill in the technical field of the present disclosure could arrive at various alterations or modifications within the technical ideas described in the scope of claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art on the basis of the description of this specification.

Further, the present technology can have the following configurations.

(1) A transmission apparatus, including
 a transmission unit that
  transmits a packet including divided image data as payload data, the divided image data being obtained by dividing image data having a predetermined frame frequency into a predetermined number of frames,
  the image data having the predetermined frame frequency being subjected to mixing processing for each frame, image data of a previous frame and/or a subsequent frame being selectively used in the mixing processing, and
  further transmits metadata including information regarding the mixing processing in association with image data or each frame.

(2) The transmission apparatus according to (1), in which
 the transmission unit inserts the metadata into a payload header of the packet including at least a top of the image data of each frame and transmits the metadata.

(3) The transmission apparatus according to (1), in which
 the transmission unit transmits the metadata in a metadata-dedicated packet associated with the packet including the image data of each frame.

(4) The transmission apparatus according to any one of (1) to (3), in which
 the information regarding the mixing processing includes information indicating whether image data of a corresponding frame is subjected to mixing processing or not.

(5) The transmission apparatus according to any one of (1) to (4), in which
 the information regarding the mixing processing includes information of a camera shutter speed at capturing.

(6) The transmission apparatus according to any one of (1) to (5), in which
 the information regarding the mixing processing includes information of a frame rate of a mixing processing target picture.

(7) The transmission apparatus according to any one of (1) to (6), in which
 the information regarding the mixing processing includes information of a frame rate obtained after the mixing processing.

(8) The transmission apparatus according to any one of (1) to (7), in which
 the information regarding the mixing processing includes information indicating a mixing processing target picture.

(9) The transmission apparatus according to any one of (1) to (8), in which
the information regarding the mixing processing includes information indicating a filter operation coefficient ratio at mixing.
(10) The transmission apparatus according to any one of (1) to (9), in which
the mixing processing includes a predetermined number of stages of the mixing processing.
(11) The transmission apparatus according to any one of (1) to (10), in which
the packet conforms to a format prescribed by a standard regarding video signal transmission using an Internet protocol (IP) network.
(12) The transmission apparatus according to (11), in which the standard is SMPTE ST2022-6.
(13) The transmission apparatus according to (11), in which the standard is SMPTE ST2110-20.
(14) The transmission apparatus according to any one of (1) to (13), further including
a mixing processing unit that performs the mixing processing.
(15) A transmission method, including
transmitting a packet including divided image data as payload data, the divided image data being obtained by dividing image data having a predetermined frame frequency into a predetermined number of frames,
the image data having the predetermined frame frequency being subjected to mixing processing for each frame, image data of a previous frame and/or a subsequent frame being selectively used in the mixing processing; and
transmitting metadata including information regarding the mixing processing in association with image data of each frame.
(16) An encoding apparatus, including:
a reception unit that
receives a packet including divided image data as payload data, the divided image data being obtained by dividing image data having a predetermined frame frequency into a predetermined number of frames,
the image date having the predetermined frame frequency being subjected to mixing processing for each frame, image data of a previous frame and/or a subsequent frame being selectively used in the mixing processing, and
further receives metadata including information regarding the mixing processing, the metadata being associated with image data of each frame,
the information regarding the mixing processing including information indicating whether image data of a corresponding frame is subjected to mixing processing or not; and
an encoding unit that, on the basis of the information regarding the mixing processing, encodes, among the image data having the predetermined frame frequency, image data of a frame subjected to the mixing processing as image data of a base layer and encodes, among the image data having the predetermined frame frequency, image data of a frame not subjected to the mixing processing as image data of an enhanced layer.
(17) An encoding method, including:
receiving a packet including divided image data as payload data, the divided image data being obtained by dividing image data having a predetermined frame frequency into a predetermined number of frames,
the image data having the predetermined frame frequency being subjected to mixing processing for each frame, image data of a previous frame and/or a subsequent frame being selectively used in the mixing processing;
receiving metadata including information regarding the mixing processing, the metadata being associated with image data of each frame,
the information regarding the mixing processing including information indicating whether image data of a corresponding frame is subjected to mixing processing or not; and
encoding, among the image data having the predetermined frame frequency, image data of a frame subjected to the mixing processing as image data of a base layer and encoding, among the image data having the predetermined frame frequency, image data of a frame not subjected to the mixing processing as image data of an enhanced layer, on the basis of the information regarding the mixing processing.
(18) A reception apparatus, including:
a reception unit that
receives a packet including divided image data as payload data, the divided image data being obtained by dividing image data having a predetermined frame frequency into a predetermined number of frames,
the image data having the predetermined frame frequency being subjected to mixing processing for each frame, image data of a previous frame and/or a subsequent frame being selectively used in the mixing processing, and
further receives metadata including information regarding the mixing processing, the metadata being associated with image data of each frame; and
a processing unit that performs inverse mixing processing on the image data having the predetermined frame frequency on the basis of the information regarding the mixing processing, and acquires image data for display.
(19) A reception method, including:
receiving a packet including divided image data as payload data, the divided image data being obtained by dividing image data having a predetermined frame frequency into a predetermined number of frames,
the image data having the predetermined frame frequency being subjected to mixing processing for each frame, image data of a previous frame and/or a subsequent frame being selectively used in the mixing processing;
receiving metadata including information regarding the mixing processing, the metadata being associated with image data of each frame; and
performing inverse mixing processing on the image data having the predetermined frame frequency on the basis of the information regarding the mixing processing, and acquiring image data for display.

What is claimed is:
1. A transmission apparatus comprising:
an electronic processor; and
a memory including instructions that, when executed by the electronic processor, cause the electronic processor to perform a set of operations including
transmitting a packet including divided image data as payload data, the divided image data being obtained by dividing image data having a predetermined frame frequency into a predetermined number of frames,
the image data having the predetermined frame frequency being subjected to mixing processing for each frame, and additional image data of a previous frame and/or a subsequent frame being selectively used in the mixing processing, and transmitting metadata including information regarding the mixing processing in association with image data of the each frame.

2. The transmission apparatus according to claim 1, wherein
the set of operations further includes inserting the metadata into a payload header of the packet including at least a top of the image data of the each frame.

3. The transmission apparatus according to claim 1, wherein
the set of operations further includes transmitting the metadata in a metadata-dedicated packet associated with the packet including the image data of the each frame.

4. The transmission apparatus according to claim 1, wherein
the information regarding the mixing processing includes information indicating whether image data of a corresponding frame is subjected to mixing processing.

5. The transmission apparatus according to claim 1, wherein
the information regarding the mixing processing includes information of a camera shutter speed at capturing.

6. The transmission apparatus according to claim 1, wherein
the information regarding the mixing processing includes information of a frame rate of a mixing processing target picture.

7. The transmission apparatus according to claim 1, wherein
the information regarding the mixing processing includes information of a frame rate obtained after the mixing processing.

8. The transmission apparatus according to claim 1, wherein
the information regarding the mixing processing includes information indicating a mixing processing target picture.

9. The transmission apparatus according to claim 1, wherein
the information regarding the mixing processing includes information indicating a filter operation coefficient ratio at mixing.

10. The transmission apparatus according to claim 1, wherein
the mixing processing includes a predetermined number of stages of the mixing processing.

11. The transmission apparatus according to claim 1, wherein
the packet conforms to a format prescribed by a standard regarding video signal transmission using an internet protocol (IP) network.

12. The transmission apparatus according to claim 11, wherein
the standard is SMPTE ST2022-6.

13. The transmission apparatus according to claim 11, wherein
the standard is SMPTE ST2110-20.

14. The transmission apparatus according to claim 1, wherein the set of operations further includes performing the mixing processing.

15. A transmission method, the method comprising:
transmitting, with an electronic processor, a packet including divided image data as payload data, the divided image data being obtained by dividing image data having a predetermined frame frequency into a predetermined number of frames,
the image data having the predetermined frame frequency being subjected to mixing processing for each frame, and additional image data of a previous frame and/or a subsequent frame being selectively used in the mixing processing; and
transmitting, with the electronic processor, metadata including information regarding the mixing processing in association with image data of the each frame.

16. An encoding apparatus comprising:
an electronic processor; and
a memory including instructions that, when executed by the electronic processor, cause the electronic processor to perform a set of operations including
receiving a packet including divided image data as payload data, the divided image data being obtained by dividing image data having a predetermined frame frequency into a predetermined number of frames,
the image data having the predetermined frame frequency being subjected to mixing processing for each frame, and additional image data of a previous frame and/or a subsequent frame being selectively used in the mixing processing;
receiving metadata including information regarding the mixing processing, the metadata being associated with image data of the each frame,
the information regarding the mixing processing including information indicating whether image data of a corresponding frame is subjected to mixing processing or not; and
encoding, on a basis of the information regarding the mixing processing, among the image data having the predetermined frame frequency, image data of a frame subjected to the mixing processing as base layer image data, and among the image data having the predetermined frame frequency, image data of a frame not subjected to the mixing processing as enhanced layer image data.

17. An encoding method, the method comprising:
receiving, with an electronic processor, a packet including divided image data as payload data, the divided image data being obtained by dividing image data having a predetermined frame frequency into a predetermined number of frames,
the image data having the predetermined frame frequency being subjected to mixing processing for each frame, and additional image data of a previous frame and/or a subsequent frame being selectively used in the mixing processing;
receiving, with the electronic processor, metadata including information regarding the mixing processing, the metadata being associated with image data of the each frame,
the information regarding the mixing processing including information indicating whether image data of a corresponding frame is subjected to mixing processing or not; and
encoding, with the electronic processor, among the image data having the predetermined frame frequency, image data of a frame subjected to the mixing processing as base layer image data, and among the image data having the predetermined frame frequency, image data of a frame not subjected to the mixing processing as enhanced layer image data, on a basis of the information regarding the mixing processing.

18. A reception apparatus comprising:
an electronic processor; and
a memory including instructions that, when executed by the electronic processor, causes the electronic processor to perform a set of operations including
  receiving a packet including divided image data as payload data, the divided image data being obtained by dividing image data having a predetermined frame frequency into a predetermined number of frames,
  the image data having the predetermined frame frequency being subjected to mixing processing for each frame, and additional image data of a previous frame and/or a subsequent frame being selectively used in the mixing processing;
  receiving metadata including information regarding the mixing processing, the metadata being associated with image data of the each frame;
  performing inverse mixing processing on the image data having the predetermined frame frequency on a basis of the information regarding the mixing processing; and
  acquiring display image data based on the inverse mixing processing on the image data having the predetermined frame frequency.

19. A reception method, the method comprising:
receiving, with an electronic processor, a packet including divided image data as payload data, the divided image data being obtained by dividing image data having a predetermined frame frequency into a predetermined number of frames,
the image data having the predetermined frame frequency being subjected to mixing processing for each frame, and additional image data of a previous frame and/or a subsequent frame being selectively used in the mixing processing;
receiving, with the electronic processor, metadata including information regarding the mixing processing, the metadata being associated with image data of the each frame;
performing, with the electronic processor, inverse mixing processing on the image data having the predetermined frame frequency on a basis of the information regarding the mixing processing; and
acquiring, with the electronic processor, display image data based on the inverse mixing processing on the image data having the predetermined frame frequency.

* * * * *